US012737583B2

(12) United States Patent
Zheng et al.

(10) Patent No.: US 12,737,583 B2
(45) Date of Patent: Sep. 15, 2026

(54) METHOD AND APPARATUS FOR CONSTRUCTING NETWORK STRUCTURE OPTIMIZER, AND COMPUTER-READABLE STORAGE MEDIUM

(71) Applicant: Tencent Technology (Shenzhen) Company Limited, Shenzhen (CN)

(72) Inventors: Yin Zheng, Shenzhen (CN); Yong Guo, Shenzhen (CN); Bingzheng Wei, Shenzhen (CN); Hanyu Huang, Shenzhen (CN); Yan Huang, Shenzhen (CN); Su Wang, Shenzhen (CN); Yanxiong Lu, Shenzhen (CN); Leyu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1067 days.

(21) Appl. No.: 17/507,687

(22) Filed: Oct. 21, 2021

(65) Prior Publication Data

US 2022/0044094 A1 Feb. 10, 2022

Related U.S. Application Data

(63) Continuation of application No. PCT/CN2020/120220, filed on Oct. 10, 2020.

(30) Foreign Application Priority Data

Oct. 25, 2019 (CN) ......................... 201911023909.8

(51) Int. Cl.
*G06N 3/04* (2023.01)

(52) U.S. Cl.
CPC ..................................... *G06N 3/04* (2013.01)

(58) Field of Classification Search
CPC ........................................................ G06N 3/04
See application file for complete search history.

(56) References Cited

U.S. PATENT DOCUMENTS 9,753,959 B2 * 9/2017 Birdwell .................. G06N 3/10
2012/0121161 A1 * 5/2012 Eade ..................... G06F 16/444 901/1

(Continued)

FOREIGN PATENT DOCUMENTS

CN 109523532 A 3/2019
CN 109934285 A 6/2019

(Continued)

OTHER PUBLICATIONS

Tencent Technology, ISR, PCT/CN2020/120220, Jan. 15, 2021, 2 pgs.

(Continued)

*Primary Examiner* — Jennifer N Welch
*Assistant Examiner* — Quoc Ly Phu Phung
(74) *Attorney, Agent, or Firm* — Morgan, Lewis & Bockius LLP

(57) ABSTRACT

This application provides a method for constructing a network structure optimizer performed by an electronic device. The method includes: performing feature extraction on a network structure of an image recognition neural network by using a network structure optimizer, to obtain feature information corresponding to the network structure; predicting the feature information by using the network structure optimizer, to determine a plurality of optimization manners for the network structure; updating the network structure of the image recognition neural network according to the optimization manners for the network structure, to obtain an optimized network structure of the image recognition neural network; and determining an image recognition performance parameter of the optimized network structure of the (Continued)

image recognition neural network, and updating a parameter of the network structure optimizer according to the image recognition performance parameter, the network structure optimizer being configured to optimize the network structure of the image recognition neural network.

20 Claims, 11 Drawing Sheets

(56) References Cited

U.S. PATENT DOCUMENTS

| | | | | |
|---|---|---|---|---|
| 2016/0071010 | A1* | 3/2016 | Tian | G06N 3/08 706/25 |
| 2016/0260011 | A1 | 9/2016 | Corvinelli et al. | |
| 2018/0122114 | A1* | 5/2018 | Luan | G06N 3/08 |
| 2019/0066268 | A1* | 2/2019 | Song | G06N 3/045 |
| 2019/0087985 | A1* | 3/2019 | Li | G06T 15/005 |
| 2019/0294928 | A1* | 9/2019 | Zhang | G06V 10/82 |
| 2019/0294955 | A1* | 9/2019 | Uchida | G06N 20/20 |
| 2019/0303715 | A1* | 10/2019 | Jiang | G06N 3/084 |
| 2020/0191586 | A1* | 6/2020 | Luo | G01C 21/3492 |
| 2020/0279156 | A1* | 9/2020 | Cai | G06N 3/0464 |

FOREIGN PATENT DOCUMENTS

| | | | |
|---|---|---|---|
| CN | 109961142 | A | 7/2019 |
| CN | 110046706 | A | 7/2019 |
| CN | 110782015 | A | 2/2020 |

OTHER PUBLICATIONS

Tencent Technology, WO, PCT/CN2020/120220, Jan. 15, 2021, 5 pgs.

Tencent Technology, IPRP, PCT/CN2020/120220, Apr. 26, 2022, 6 pgs.

* cited by examiner

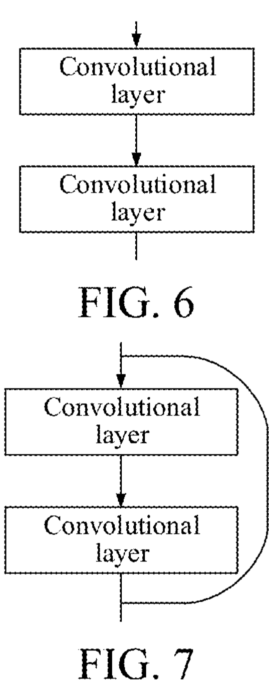
FIG. 6
FIG. 7
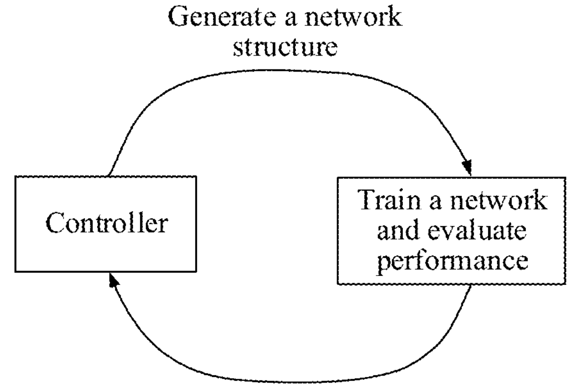
FIG. 8
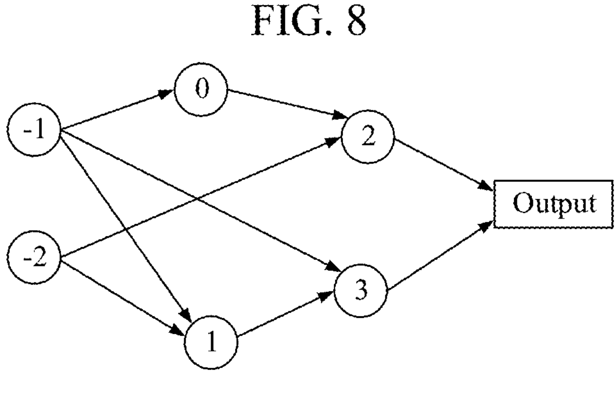
FIG. 9

METHOD AND APPARATUS FOR CONSTRUCTING NETWORK STRUCTURE OPTIMIZER, AND COMPUTER-READABLE STORAGE MEDIUM

CROSS-REFERENCE TO RELATED APPLICATIONS

This application is a continuation application of PCT Patent Application No. PCT/CN2020/120220, entitled-METHOD AND APPARATUS FOR CONSTRUCTING NETWORK STRUCTURE OPTIMIZER, AND COMPUTER-READABLE STORAGE MEDIUM" filed on Oct. 10, 2020, which claims priority to Chinese Patent Application No. 201911023909.8, filed with the State Intellectual Property Office of the People's Republic of China on Oct. 25, 2019, and entitled-TRAINING METHOD AND DEVICE FOR NETWORK STRUCTURE OPTIMIZER OF NEURAL NETWORK AND STORAGE MEDIUM", all of which are incorporated herein by reference in their entirety.

FIELD OF THE TECHNOLOGY

This application relates to artificial intelligence (AI) technologies, and to a method and apparatus for constructing a network structure optimizer, a method and apparatus for optimizing a network structure of an image recognition neural network, an electronic device, and a computer-readable storage medium.

BACKGROUND OF THE DISCLOSURE

AI is a comprehensive technology of computer science, and is to study design principles and implementation methods of various intelligent machines, so that the machines have the functions of perception, reasoning, and decision-making. The AI technology is a comprehensive discipline, which covers a wide range of fields, for example, fields such as a natural language processing technology, and machine learning (ML)/deep learning (DL). With the development of technologies, the AI technology will be applied in more fields and play an increasingly important role.

Neural networks have attracted wide attention from the academia and industry, and have gained breakthrough results in many application fields such as image recognition.

However, a network structure of an image recognition neural network has some redundant calculation units or calculation operations, and the redundancy increases calculation costs.

SUMMARY

Embodiments of this application provide a method and apparatus for constructing a network structure optimizer, an electronic device, and a computer-readable storage medium, to save calculation costs by optimizing a network structure of a neural network by using a network structure optimizer.

The technical solutions in the embodiments of this application are implemented as follows.

The embodiments of this application provide a method for constructing a network structure optimizer, performed by an electronic device, the method including:

performing feature extraction on a network structure of a neural network by using a network structure optimizer, to obtain feature information corresponding to the network structure;

predicting the feature information by using the network structure optimizer, to determine a plurality of optimization manners for the network structure;

updating the network structure of the neural network according to the optimization manners for the network structure, to obtain an optimized network structure of the image recognition neural network; and determining a performance parameter of the optimized network structure, and updating a parameter of the network structure optimizer according to the performance parameter, the network structure optimizer being configured to optimize the network structure of the neural network.

The embodiments of this application provide a method for optimizing a network structure of a neural network, performed by an electronic device and applicable to the network structure optimizer of a neural network, the method including:

performing feature extraction on a network structure of a neural network by using a network structure optimizer, to obtain feature information corresponding to the network structure;

predicting the feature information by using the network structure optimizer, to determine optimization manners for the network structure; and updating the network structure of the neural network according to the optimization manners for the network structure, to obtain an optimized network structure of the image recognition neural network.

The embodiments of this application provide a method for constructing a network structure optimizer, performed by an electronic device, the method including:

performing feature extraction on a network structure of an image recognition neural network by using a network structure optimizer, to obtain feature information corresponding to the network structure;

predicting the feature information by using the network structure optimizer, to determine a plurality of optimization manners for the network structure;

updating the network structure of the image recognition neural network according to the optimization manners for the network structure, to obtain an optimized network structure of the image recognition neural network; and determining an image recognition performance parameter of the optimized network structure, and updating a parameter of the network structure optimizer according to the image recognition performance parameter, the network structure optimizer being configured to optimize the network structure of the image recognition neural network.

The embodiments of this application provide a method for optimizing a network structure of an image recognition neural network, performed by an electronic device and applicable to the network structure optimizer, the method including:

performing feature extraction on the network structure of the image recognition neural network by using the updated network structure optimizer, to obtain feature information corresponding to the network structure;

predicting the feature information by using the updated network structure optimizer, to determine optimization manners for the network structure; and updating the network structure of the image recognition neural network according to the optimization manners for the network structure, to obtain an optimized network structure, the optimized network structure being used for performing an image recognition task.

The embodiments of this application provide an apparatus for constructing a network structure optimizer, the apparatus including:

- a first extraction module, configured to perform feature extraction on a network structure of an image recognition neural network by using a network structure optimizer, to obtain feature information corresponding to the network structure;
- a first prediction module, configured to predict the feature information by using the network structure optimizer, to determine a plurality of optimization manners for the network structure;
- a first optimization module, configured to update the network structure of the image recognition neural network according to the optimization manners for the network structure, to obtain an optimized network structure of the image recognition neural network; and
- a training module, configured to determine an image recognition performance parameter of the optimized network structure, and update a parameter of the network structure optimizer according to the image recognition performance parameter, the network structure optimizer being configured to optimize the network structure of the image recognition neural network.

The embodiments of this application provide an apparatus for optimizing a network structure of a neural network, the apparatus including:

- a second extraction module, configured to perform feature extraction on the network structure of the image recognition neural network by using the updated network structure optimizer, to obtain feature information corresponding to the network structure;
- a second prediction module, configured to predict the feature information by using the updated network structure optimizer, and determine optimization manners for the network structure; and
- a second optimization module, configured to update the network structure of the image recognition neural network according to the optimization manners for the network structure, to obtain an optimized network structure, the optimized network structure being used for performing an image recognition task.

The embodiments of this application provide an electronic device configured to construct a network structure optimizer, the electronic device including:

- a memory, configured to store executable instructions; and
- a processor, configured to implement, when executing the executable instructions stored in the memory, the method for constructing a network structure optimizer according to the embodiments of this application.

The embodiments of this application provide an electronic device configured to optimize a network structure of an image recognition neural network, the electronic device including:

- a memory, configured to store executable instructions; and
- a processor, configured to implement, when executing the executable instructions stored in the memory, the method for optimizing a network structure of an image recognition neural network according to the embodiments of this application.

The embodiments of this application provide a computer-readable storage medium, storing executable instructions, when executed by a processor, configured to cause the processor to implement the method for constructing a network structure optimizer according to the embodiments of this application or to implement the method for optimizing a network structure of an image recognition neural network according to the embodiments of this application.

The embodiments of this application have the following beneficial effects:

Feature information is predicted by using a network structure optimizer, optimization manners for a network structure are determined, and the network structure of an image recognition neural network is optimized according to the optimization manners, so that any inputted network structure may be optimized; and redundant calculation units or calculation operations are removed from the network structure of the image recognition neural network, thereby saving a subsequent calculation amount, so that the model performance of the image recognition neural network can be improved. When the optimized neural network model is run on an electronic device, the precision of image recognition can be ensured on the basis of saving the consumption of hardware resources of the electronic device.

BRIEF DESCRIPTION OF THE DRAWINGS

FIG. 6 is a structural diagram of a deep neural network (DNN) stacked with convolutional layers according to the related art.

FIG. 7 is a structural diagram of a DNN with an additional connection according to the related art.

FIG. 8 is a system block diagram of neural architecture search (NAS) according to the related art.

FIG. 9 is a schematic structural diagram of a directed acyclic graph (DAG) in a neural network according to an embodiment of this application.

FIG. 11A is a schematic structural diagram of a system according to an embodiment of this application.

DESCRIPTION OF EMBODIMENTS

Figure 1:
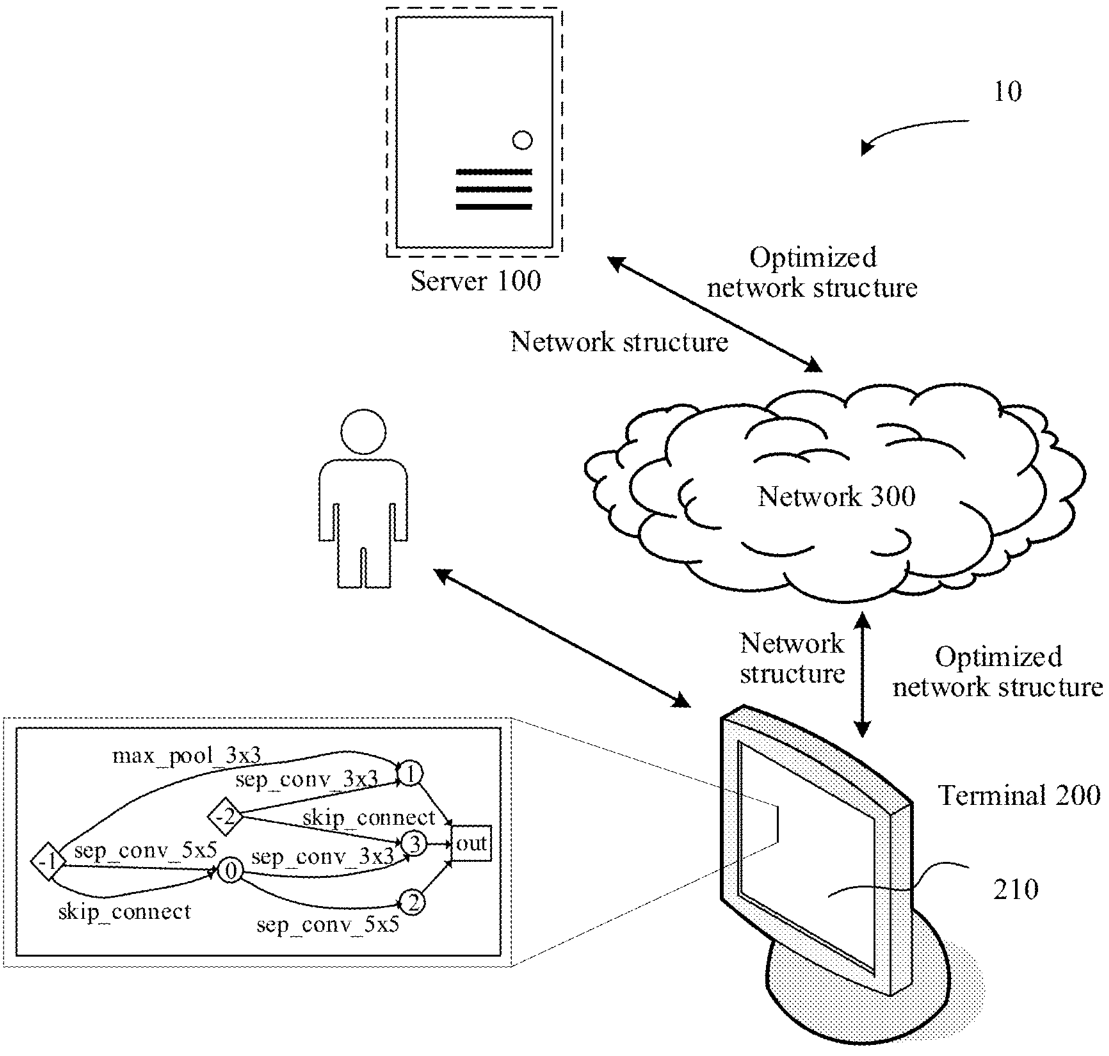
FIG. 1 is a schematic diagram of an application scenario of a system 10 for constructing a network structure optimizer according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as that usually understood by a person skilled in the art to which this application belongs. Terms used in this specification are merely intended to describe objectives of the embodiments of this application, but are not intended to limit this application.

Before the embodiments of this application are further described in detail, a description is made on nouns and terms involved in the embodiments of this application, and the nouns and terms involved in the embodiments of this application are applicable to the following explanations.

1) Image recognition: Image recognition is a technology for processing, analyzing, and understanding an image by using a computer, to recognize targets and objects in different modes, and is a practical application to which a deep learning algorithm is applied. The image recognition technology is generally divided into face recognition and item recognition. The face recognition is mainly applicable to security check, identity verification, and mobile payment; and the item identification is mainly applicable to an item circulation process, and in particular to an unmanned retail area such as an unmanned shelf or a smart retail cabinet.

2) Target detection: Target detection is also referred to as target extraction, is a type of image segmentation based on a target geometry and a statistical characteristic, and combines target segmentation and target recognition into a whole, and the accuracy and real-time performance of the target detection are an important capacity of an entire system. Especially in a complex scenario, when a plurality of targets need to be processed in real time, automatic target extraction and recognition are particularly important. With the development of computer technologies and the wide application of computer vision principles, research on real-time tracking of a target by using the computer image processing technology becomes increasingly popular, and dynamically real-time tracking and positioning on the target has a wide range of application values in aspects such as an intelligent transportation system, an intelligent monitoring system, military target detection, and positioning of a surgical instrument in medical navigation surgery.

3) Speech recognition: Speech recognition is a technology for allowing a machine to convert a voice signal into a corresponding text or command through a process of recognition and understanding. The speech recognition technologies mainly include three aspects, namely, a feature extraction technology, a pattern matching rule, and a model training technology.

4) Nature language processing (NLP): an important direction in the field of computer science and the field of AI, to implement effective communication between human and a computer by using natural language. The NLP is a science that integrates linguistics, computer science and mathematics. Therefore, this field relates to natural language, that is, a language that people use daily, so the NLP is closely related to the linguistic. The NLP technologies generally include technologies such as text processing, semantic understanding, machine translation (MT), robot question and answering, and knowledge graphs.

5) Machine reading comprehension (MRC): Given a document and a question, a machine predicts an answer to the question according to the document. For extractive MRC, an answer is generally a segment of a known document. An MRC model predicts an answer by predicting positions of a starting word and a terminating word of the answer in a known document.

6) Directed graph: A directed graph represents a relationship between objects, and the directed graph may be represented by using an ordered triplet (V(D), A(D), ΨD), where ΨD is a correlation function, and is an ordered pair of elements in which each element in A(D) corresponds to V(D).

7) Graph neural network (GNN): a neural network that directly acts on a graph structure, and mainly processes data of a non-Euclidean spatial structure (a graph structure). The GNN has an input sequence of ignoring nodes. During calculation, a representation of the node is affected by neighboring nodes, while a connection between graphs is unchanged; a representation of the graph structure makes it possible to perform graph-based reasoning. Generally, the GNN includes two modules: a propagation module and an output module. The propagation module is configured to transfer information between nodes in a graph and update a state, and the output module is configured to define objective functions according to different tasks based on vector representations of nodes and edges in a graph. The GNNs include: a GCN, a gated graph neural network (GGNN), and a graph attention network (GAT) based on an attention mechanism.

The neural networks recorded in the embodiments of this application are applicable to various fields, for example, may be an image recognition neural network, a target detection neural network, a semantic segmentation neural network, and a speech recognition neural network. That is, the neural networks in this embodiment of this application is not limited to a specific field.

In the related art, neural network structure searching methods include hand-operated/manually designed and automatic network structure searching methods.

A manually designed neural network is a network structure in which a neural network is manually designed by using experience. In a classic network structure, a neural network model is constructed by stacking convolutional layers. FIG. 6 is a structural diagram of a DNN stacked with convolutional layers according to the related art. In addition, the neural network may further constructs a model by introducing an additional connection, for example, a residual neural network (ResNet). FIG. 7 is a structural diagram of a DNN with an additional connection according to the related art. However, the manually designed network structure usually includes a large quantity of redundant calculation modules, which introduces additional calculation overheads and limits the model performance of the DNN.

NAS is shown in FIG. 8. FIG. 8 is a system block diagram of NAS according to the related art. The NAS generates a structure of a neural network by using a long short-term memory (LSTM)-based controller. A parameter of a model is trained in an image recognition task by using this structure, to obtain the performance of the structure. However, the NAS has very high training costs, and huge resources need to be consumed each time a neural network is trained from scratch. In this way, the process of training the NAS needs to consume a large quantity of resources.

In summary, a person skilled in the art does not analyze the neural network structure searching method, and the foregoing technical problems are not common knowledge for a person skilled in the art. Therefore, it is difficult for a person skilled in the art to discover and propose the foregoing technical problems. However, in the embodiments of this application, the neural network structure searching method is analyzed, to discover the foregoing technical problems.

To resolve at least the foregoing technical problems in the related art, the embodiments of this application provide a method and apparatus for constructing a network structure optimizer, an electronic device, and a computer-readable storage medium, to save calculation costs by optimizing a network structure of a neural network by using a network structure optimizer. The following describes an exemplary application of an electronic device configured to construct a network structure optimizer according to the embodiments of this application. The electronic device configured to construct a network structure optimizer according to the embodiments of this application may be a server, for example, a server deployed in cloud, which optimizes, according to a network structure of a neural network provided by another electronic device or a user, the network structure of the neural network to obtain an optimized network structure, and presents the optimized network structure to the user. For example, the server optimizes, according to a network structure of a neural network obtained by another electronic device by using a network structure optimizer, the network structure of the neural network to obtain an optimized network structure. The electronic devices may alternatively be various types of user terminals such as a notebook computer, a tablet computer, a desktop computer, and a mobile device (such as a mobile phone or a personal digital assistant (PDA)). For example, a portable terminal obtains an optimized network structure according to a network structure of a neural network inputted by the user on the portable terminal, and displays the optimized network structure on a display interface of the portable terminal, to facilitate the understanding of the optimized network structure by the user.

For example, FIG. 1 is a schematic diagram of an application scenario of a system 10 for constructing a network structure optimizer according to an embodiment of this application. A terminal 200 is connected to a server 100 through a network 300. The network 300 may be a wide area network or a local area network, or a combination of the wide area network and the local area network.

The terminal 200 may be configured to obtain a network structure of a neural network. For example, when a user inputs a network structure of a neural network through an input interface, after the input is completed, the terminal automatically obtains the network structure of the neural network inputted by the user.

In some embodiments, the terminal 200 locally performs the method for constructing a network structure optimizer provided in the embodiments of this application to obtain an optimized network structure according to the network structure of the neural network inputted by the user. For example, a network structure optimization assistant is installed on the terminal 200. The user inputs a network structure of a neural network into the network structure optimization assistant, and the terminal 200 optimizes the network structure according to the inputted network structure of the neural network by using the network structure optimizer, to obtain an optimized network structure, and displays the optimized network structure on a display interface 210 of the terminal 200, so that the user performs applications such as image recognition, target detection, semantic segmentation, speech recognition, and natural language processing according to the optimized network structure.

In some embodiments, the terminal 200 may alternatively send, through the network 300, a network structure of a neural network inputted by the user on the terminal 200 to the server 100, and invoke a function of constructing the network structure optimizer provided by the server 100. The server 100 obtains an optimized network structure by using the method for constructing a network structure optimizer provided in the embodiments of this application. For example, a network structure optimization assistant is installed on the terminal 200. The user inputs a network structure of a neural network into the network structure optimization assistant, and the terminal sends the network structure of the neural network to the server 100 through the network 300. After receiving the network structure of the neural network, the server 100 optimizes the network structure of the neural network by using the network structure optimizer, to obtain an optimized network structure, returns the optimized network structure to the network structure optimization assistant, and displays the optimized network structure on a display interface 210 of the terminal 200. Alternatively, the server 100 directly provides an optimized network structure, so that the user performs applications such as image recognition, target detection, semantic segmentation, speech recognition, and natural language processing according to the optimized network structure.

In an implementation scenario, to improve the performance of the image recognition, the server or the terminal may determine, according to an inputted network structure of a neural network for the image recognition, a plurality of optimization manners for the network structure, update the network structure of the neural network for the image recognition according to the optimization manners for the network structure, to obtain an optimized network structure, perform performance evaluation on the optimized network structure, and update a parameter of the network structure optimizer according to an evaluation result, to obtain a trained network structure optimizer, so that the server or the terminal may subsequently optimize the network structure of the neural network for the image recognition by using the trained network structure optimizer, to obtain the optimized network structure of the neural network for the image recognition, which can reduce redundant calculation units or calculation operations, and reduce calculation costs, and can further improve the performance of a model based on the network structure, and can accurately and quickly recognize images.

For example, for the application of face recognition, to improve the performance of the face recognition, the function of constructing a network structure optimizer provided in the embodiments of this application is invoked. A network structure sample of a face recognition neural network is optimized based on feature information of the network structure sample of the face recognition neural network, the network structure optimizer is trained according to an evaluation result of the optimized network structure, to obtain the trained network structure optimizer, and a structure of the face recognition neural network is optimized by using the trained network structure optimizer, to reduce redundant calculation units or calculation operations of the face recognition neural network and reduce calculation costs to obtain an optimized face recognition neural network, so that faces can further be recognized quickly on the premise of accurately recognizing the faces. The optimized face recognition neural network is applicable to an access control system (to prevent illegal personnel from arbitrarily entering or exiting), so that the access control system may quickly recognize a face of a user, and determine an access permission of the user according to the face of the user, to determine whether to open access control, thereby preventing the user from waiting for an excessively long time to open the access control, to improve the quality of life.

For example, for the application of commodity recognition, to improve the performance of the commodity recognition, the function of constructing a network structure optimizer provided in the embodiments of this application is invoked. A network structure sample of a commodity recognition neural network is optimized based on feature information of the network structure sample of the commodity recognition neural network, the network structure optimizer is trained according to an evaluation result of the optimized network structure, to obtain the trained network structure optimizer, and a structure of the commodity recognition neural network is optimized by using the trained network structure optimizer, to reduce redundant calculation units or calculation operations of the commodity recognition neural network and reduce calculation costs to obtain an optimized commodity recognition neural network, so that commodities can further be recognized quickly on the premise of accurately recognizing the commodities. The optimized commodity recognition neural network is applicable to a smart retail cabinet (where commodities are sold by nobody), so that the smart retail cabinet may quickly recognize a commodity that a user intends to purchase, determine a price of the commodity according to the recognized commodity, and present, to the user, an amount that needs to pay. After the user completes the payment, the smart retail cabinet provides the commodity to the user, thereby preventing the user from waiting for an excessive long time to purchase the commodity, to improve the quality of life.

In an implementation scenario, to improve the performance of the target detection, the server or the terminal may determine, according to an inputted network structure of a neural network for the target detection, a plurality of optimization manners for the network structure, update the network structure of the neural network for the target detection according to the optimization manners for the network structure, to obtain an optimized network structure, perform performance evaluation on the optimized network structure, and update a parameter of the network structure optimizer according to an evaluation result, to obtain a trained network structure optimizer, so that the server or the terminal may subsequently optimize the network structure of the neural network for the target detection by using the trained network structure optimizer, to obtain the optimized network structure of the neural network for the target detection, which can reduce redundant calculation units or calculation operations, and reduce calculation costs, and can further improve the performance of a model based on the network structure, and can accurately and quickly detect target objects.

In an implementation scenario, to improve the performance of the speech recognition, the server or the terminal may determine, according to an inputted network structure of a neural network for the speech recognition, a plurality of optimization manners for the network structure, update the network structure of the neural network for the speech recognition according to the optimization manners for the network structure, to obtain an optimized network structure, perform performance evaluation on the optimized network structure, and update a parameter of the network structure optimizer according to an evaluation result, to obtain a trained network structure optimizer, so that the server or the terminal may subsequently optimize the network structure of the neural network for the speech recognition by using the trained network structure optimizer, to obtain the optimized network structure of the neural network for the speech recognition, which can reduce redundant calculation units or calculation operations, and reduce calculation costs, and can further improve the model performance based on the network structure, can accurately and quickly recognize a speech, and generate a corresponding text.

In an implementation scenario, to improve the performance of the text search, the server or the terminal may determine, according to an inputted network structure of a neural network for the text search, a plurality of optimization manners for the network structure, update the network structure of the neural network for the text search according to the optimization manners for the network structure, to obtain an optimized network structure, perform performance evaluation on the optimized network structure, and update a parameter of the network structure optimizer according to an evaluation result, to obtain a trained network structure optimizer, so that the server or the terminal may subsequently optimize the network structure of the neural network for the text search by using the trained network structure optimizer, to obtain the optimized network structure of the neural network for the text search, which can reduce redundant calculation units or calculation operations, and reduce calculation costs, and can further improve the model performance based on the network structure, can accurately and quickly obtain a corresponding search text according to search information.

In an implementation scenario, to improve the performance of a question answering system, the server or the terminal may determine, according to an inputted network structure of a neural network for question-answering, a plurality of optimization manners for the network structure, update the network structure of the neural network for the question-answering according to the optimization manners for the network structure, to obtain an optimized network structure, perform performance evaluation on the optimized network structure, and update a parameter of the network structure optimizer according to an evaluation result, to obtain a trained network structure optimizer, so that the server or the terminal may subsequently optimize the network structure of the neural network for the question-answering by using the trained network structure optimizer, to obtain the optimized network structure of the neural network for the question-answering, which can reduce redundant calculation units or calculation operations, and reduce calculation costs, and can further improve the model performance based on the network structure, can accurately and quickly obtain a corresponding answer according to problem information.

The structure of the electronic device configured to construct a network structure optimizer provided in the embodiments of this application continues to be described. The electronic devices configured to construct a network structure optimizer may be various terminals, such as a mobile phone and a computer, or the electronic device may be the server 100 shown in FIG. 1.

Figures 2, 3A:
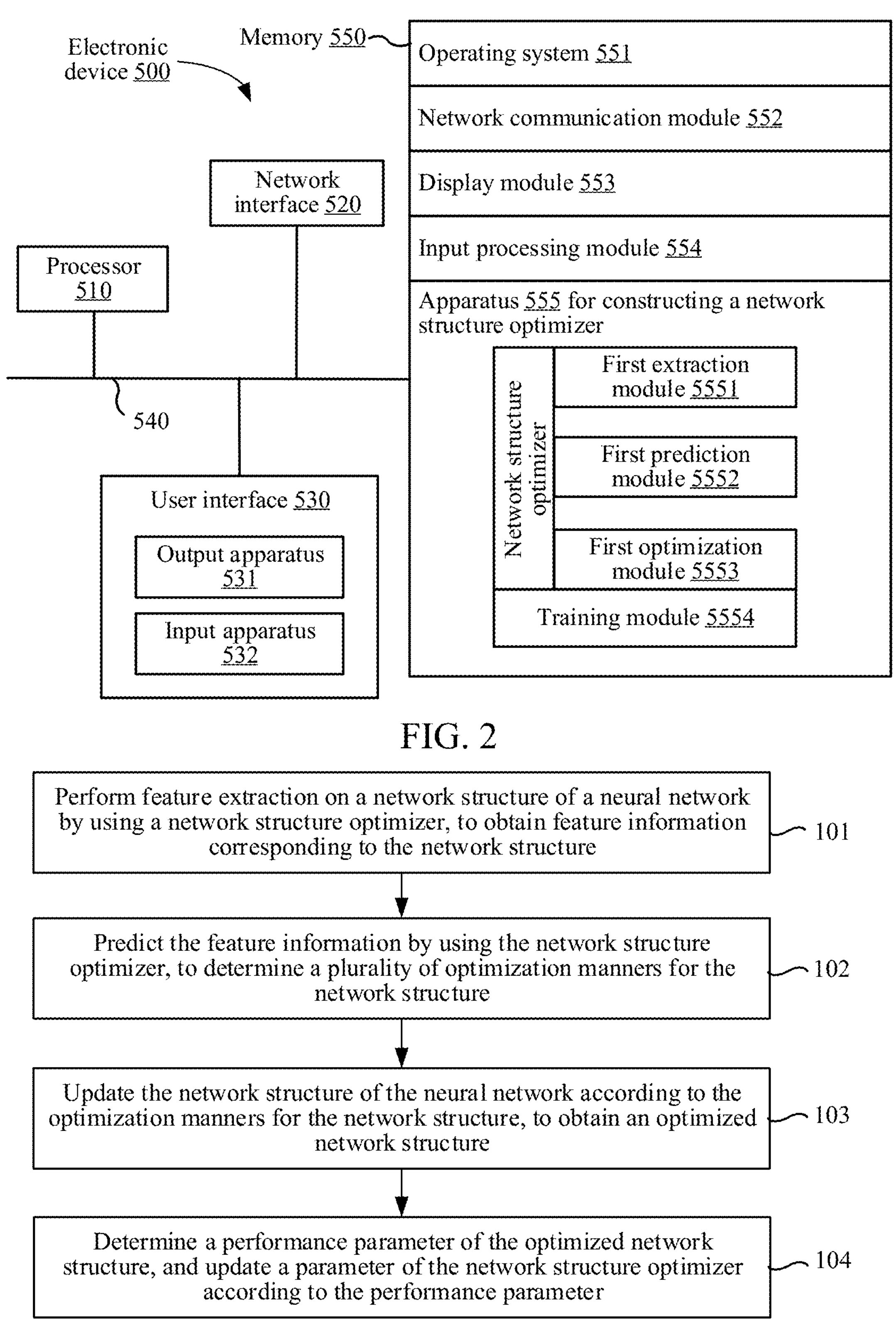
FIG. 2 is a schematic structural diagram of an electronic device 500 configured to construct a network structure optimizer according to an embodiment of this application.
FIG. 3A and FIG. 3B are schematic flowcharts of a method for constructing a network structure optimizer according to an embodiment of this application.

FIG. 2 is a schematic structural diagram of an electronic device 500 configured to construct a network structure optimizer according to an embodiment of this application. The electronic device 500 configured to construct a network structure optimizer shown in FIG. 2 includes: at least one processor 510, a memory 550, at least one network interface 520, and a user interface 530. All components in the electronic device 500 configured to construct a network structure optimizer are coupled together by using a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can present media content, including one or more speakers and/or one or more visual display screens. The user interface 530 further includes one or more input apparatuses 532, including a user interface component for helping a user input, such as a keyboard, a mouse, a microphone, a touch display screen, a camera, or other input button and control.

The memory 550 includes a volatile memory or a non-volatile memory, or may include both a volatile memory and a non-volatile memory. The non-volatile memory may be a read-only memory (ROM), and the volatile memory may be a random access memory (RAM). The memory 550 described in this embodiment of this application is to include any other suitable type of memories. The memory 550 optionally includes one or more storage devices that are physically away from the processor 510.

In some embodiments, the memory 550 may store data to support various operations. Examples of the data include a program, a module, and a data structure, or a subset or a superset thereof, which are described below by using examples.

An operating system 551 includes a system program configured to process various basic system services and perform hardware-related tasks, for example, a framework layer, a core library layer, or a driver layer, which is configured to implement various basic services and process hardware-related tasks.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

A display module 553 is configured to present information by using an output apparatus 531 (such as a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the apparatus for constructing a network structure optimizer provided in the embodiments of this application may be implemented in a manner of a combination of software and hardware. For example, the apparatus for constructing a network structure optimizer provided in the embodiments of this application may be a processor in the form of a hardware decoding processor, which is programmed to perform the method for constructing a network structure optimizer provided in the embodiments of this application. For example, the processor in the form of a hardware decoding processor may use one or more application-specific integrated circuits (ASICs), a DSP, a PLD, a complex programmable logic device (CPLD), a field-programmable gate array (FPGA), or another electronic element.

In some other embodiments, the apparatus for constructing a network structure optimizer provided in the embodiments of this application may be implemented in a manner of software. FIG. 2 shows an apparatus 555 for constructing a network structure optimizer stored in the memory 550, which may be software in the form of a program, a plug-in, or the like and includes a series of modules, including a first extraction module 5551, a first prediction module 5552, a first optimization module 5553, and a training module 5554, where the first extraction module 5551, the first prediction module 5552, the first optimization module 5553, and the training module 5554 are configured to implement the method for constructing a network structure optimizer provided in the embodiments of this application.

It may be understood according to the above that the method for constructing a network structure optimizer provided in the embodiments of this application may be implemented by various types of electronic devices configured to construct a network structure optimizer, for example, a smart terminal and a server.

The method for constructing a network structure optimizer provided in the embodiments of this application is described below with reference to an exemplary application and implementation of the server provided in this embodiment of this application. FIG. 3A is a schematic flowchart of a method for constructing a network structure optimizer according to an embodiment of this application, which is described with reference to steps shown in FIG. 3A.

Neural networks in the following steps are applicable to various fields, for example, may be an image recognition neural network, a target detection neural network, a semantic segmentation neural network, and a speech recognition neural network. That is, the neural networks in this embodiment of this application is not limited to a specific field.

In step 101, feature extraction is performed on a network structure of a neural network by using a network structure optimizer, to obtain feature information corresponding to the network structure.

To optimize any inputted network structure of a neural network, feature extraction needs to be performed on the network structure of the neural network by using the network structure optimizer, to obtain feature information corresponding to the network structure, so as to facilitate in subsequently selecting corresponding optimization manners according to the feature information.

Figure 3B:
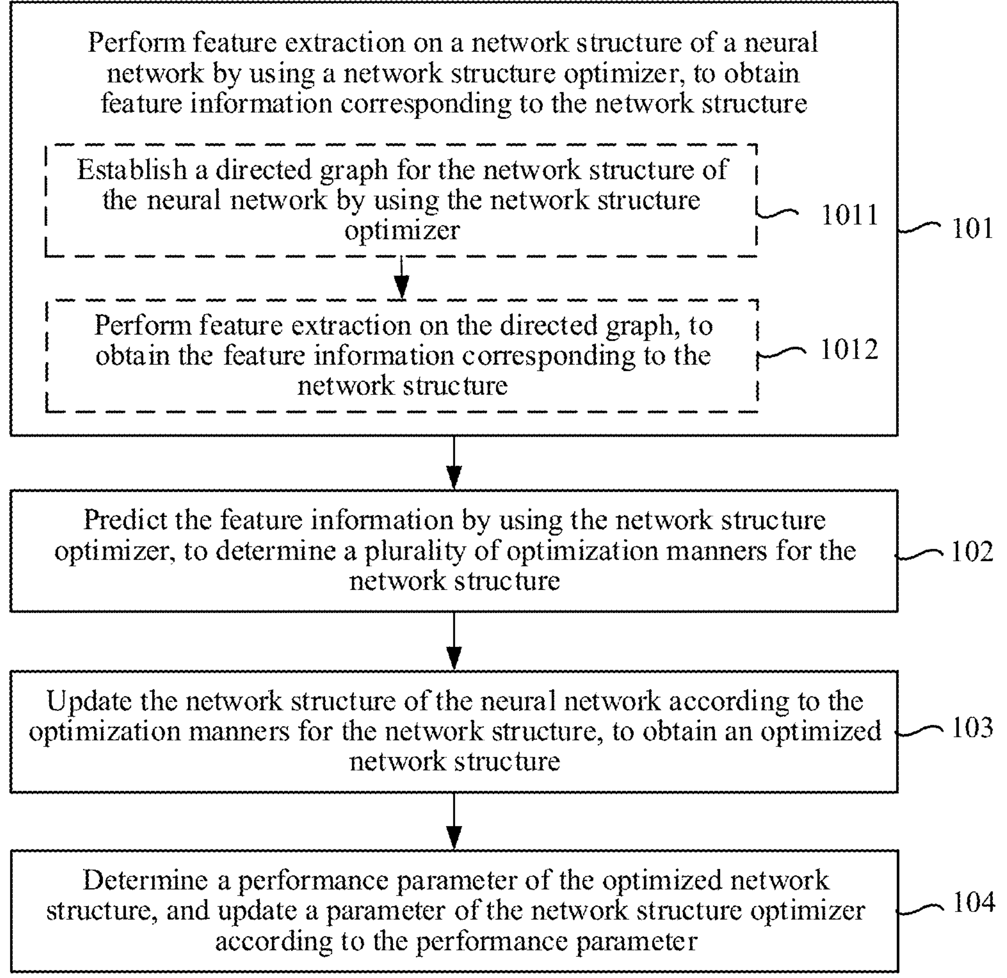

FIG. 3B is a schematic flowchart according to an embodiment of this application. In some embodiments, step 101 shown in FIG. 3A may be implemented by using step 1011 and step 1012 shown in FIG. 3B.

In step 1011, a directed graph for the network structure of the neural network is established by using the network structure optimizer.

To extract all important features of the network structure, the corresponding directed graph may be established according to the network structure of the neural network, to facilitate in subsequently performing feature extraction on the directed graph, to obtain feature information corresponding to the network structure, thereby ensuring that all the important features of the network structure are extracted.

In some embodiments, the establishing a directed graph for the network structure of the neural network by using the network structure optimizer includes: performing sampling processing on the network structure of the neural network by using the network structure optimizer, to obtain network layer information for the network structure; and establishing the directed graph for the network structure according to the network layer information.

To extract network layer information of the network structure, random sampling needs to be performed on the network structure of the neural network by using the network structure optimizer, to extract the network layer information of the network structure, and a directed graph for the network structure is established according to the network layer information of the network structure.

In some embodiments, the establishing the directed graph for the network structure according to the network layer information includes: determining an input feature or an output feature in the network layer information as node information in the directed graph; determining operation information in the network layer information as edge information in the directed graph; and establishing the directed graph for the network structure according to the node information and the edge information, the operation information including at least one of the following: a convolution operation, a skip connection operation, a pooling operation, and a null connection operation.

The network layer information includes the input feature or the output feature, and the operation information, the operation information including at least one of the following: a convolution operation, a skip connection operation, a pooling operation, a null connection operation, the input feature being an input node of a network layer, the output feature being an output node of a network layer. The input feature or the output feature in the network layer information is determined as node information in the directed graph, and the operation information in the network layer information is determined as edge information in the directed graph, to establish the directed graph for the network structure according to the node information and the edge information, so as to facilitate in subsequently extracting feature information for the network structure according to the directed graph.

In step 1012, feature extraction is performed on the directed graph, to obtain feature information corresponding to the network structure.

After the directed graph is established, feature extraction is performed on the directed graph, to obtain the feature information corresponding to the network structure, thereby ensuring that all important features of the network structure are extracted.

In some embodiments, the performing feature extraction on the directed graph, to obtain the feature information corresponding to the network structure includes: determining node information and edge information in the directed graph; and determining the feature information corresponding to the network structure according to learnable parameter matrixes and an activation function in a GCN, the node information, and the edge information.

After the directed graph for the network structure is established, the node information and the edge information in the directed graph may be first determined, and a series of processing such as convolution and full connection may be then performed subsequently on the node information and the edge information in the directed graph according to a GCN, to determine the feature information corresponding to the network structure.

In some embodiments, the determining the feature information corresponding to the network structure according to learnable parameter matrixes and an activation function in a GCN, the node information, and the edge information includes: performing a multiplication operation on the edge information, the node information, and a learnable parameter matrix in a first-layer GCN, to obtain an output of the first-layer GCN; performing nonlinear transformation on the output of the first-layer GCN by using the activation function in the GCN, to obtain a transformed output of the first-layer GCN; performing a multiplication operation on the transformed output of the first-layer GCN and a learnable parameter matrix in a second-layer GCN, to obtain an output of the second-layer GCN; and performing a multiplication operation on the output of the second-layer GCN, the edge information, and a learnable parameter matrix of a fully-connected layer in the GCN, to obtain the feature information corresponding to the network structure.

The GCN may use two layers of convolutional layers, and this application is not limited to the two layers of convolutional layers. To extract the feature information of the network structure, the directed graph may be inputted into the GCN, and is calculated sequentially through two layers of GCN and the fully-connected layer, to obtain the feature information corresponding to the network structure.

In step 102, the feature information is predicted by using the network structure optimizer, to determine a plurality of optimization manners for the network structure.

After the feature information of the network structure is extracted, the feature information may be predicted by using the network structure optimizer, to determine a plurality of optimization manners for the network structure, so as to facilitate in subsequently optimizing the network structure by using the optimization manners.

In some embodiments, the predicting the feature information by using the network structure optimizer, to determine a plurality of optimization manners for the network structure includes: classifying the feature information by using the network structure optimizer, and determining probabilities corresponding to the optimization manners of the network structure; and determining, according to the probabilities of the optimization manners of the network structure, optimization manners for the network structure that meet a probability requirement in the plurality of optimization manners.

After the feature information is classified by using the network structure optimizer, and the probabilities corresponding to the optimization manners of the network structure are determined, it can be determined whether the probabilities of the optimization manners of the network structure are greater than a set threshold. If the probabilities of the optimization manners of the network structure are greater than the set threshold, it is determined that the optimization manners corresponding to the probabilities are the optimization manners for the network structure; if the probabilities of the optimization manners of the network structure are less than or equal to the set threshold, it is determined that the optimization manners corresponding to the probabilities are not the optimization manners for the network structure, the set threshold being a parameter value preset by the user in the server. After the feature information is classified by using the network structure optimizer, and the probabilities of the optimization manners corresponding to the network structure are determined, the probabilities corresponding to the optimization manners of the network structure may be sorted in descending order, and it is determined that optimization manners corresponding to first K probabilities are the optimization manners for the network structure, K being a parameter value preset by the user in the server.

In step 103, the network structure of the neural network is updated according to the optimization manners for the network structure, to obtain an optimized network structure.

After the optimization manners of the network structure are determined, the network structure optimizer may update and replace an original structure in the network structure of the neural network according to the optimization manners of the network structure, to obtain an optimized network structure, to facilitate in subsequently performing performance evaluation according to the optimized network structure and the network structure before optimization.

In some embodiments, the updating the network structure of the neural network according to the optimization manners for the network structure, to obtain an optimized network structure includes: determining operation information, sizes of network layers, and a quantity of network layers in the optimization manners; and replacing operation information, sizes of network layers, and a quantity of network layers in the network structure of the neural network with the operation information, the sizes of the network layers, and the quantity of network layers in the optimization manners, to obtain the optimized network structure, the sizes of the network layers including at least one of the following: a size of a convolution kernel and a size of a pooling layer; and the operation information including at least one of the following: a convolution operation, a skip connection operation, a pooling operation, and a null connection operation. To implement that the network structure obtained by optimizing the network structure has lower calculation complexity, each operation in the network structure may be replaced (by using an optimization manner). For example, the convolution operation may be changed into the skip connection operation or the null connection operation, and the skip connection operation may be changed into the null connection operation, or the like. A size of a network layer in the network structure may be further replaced. For example, a convolution kernel of 5*5 is replaced with a convolution kernel of 3*3. A quantity of network layers in the network structure may be further replaced. For example, three convolutional layers of 3*3 are replaced with two convolutional layers of 3*3.

In step 104, a performance parameter of the optimized network structure is determined, and a parameter of the network structure optimizer is updated according to the performance parameter.

To train the network structure optimizer, performance evaluation may be performed according to the network structure before optimization and the optimized network structure, and the parameter of the network structure optimizer is updated according to an evaluation result, to train the network structure optimizer, the network structure optimizer being configured to optimize the network structure of the neural network.

In some embodiments, before the determining a performance parameter of the optimized network structure, the method includes: respectively visualizing the optimized network structure and the network structure of the neural network, to obtain visualization results corresponding to the optimized network structure and the network structure of the neural network; and using, in response to an adjustment operation corresponding to the visualization results, the adjustment operation as the image recognition performance parameter of the optimized network structure.

Performance evaluation may be performed on the optimized network structure through visualization. The optimized network structure and the network structure before optimization may be respectively visualized, to obtain visualization results corresponding to the optimized network structure and the network structure before optimization, and the visualization results are presented to the user. The user may adjust the optimized network structure and the network structure before optimization according to the visualization results. After receiving the adjustment of the user on the optimized network structure and the network structure before optimization, the server updates the parameter of the network structure in response to an adjustment operation corresponding to the visualization results, to train the network structure optimizer.

In some embodiments, the determining a performance parameter of the optimized network structure, and updating a parameter of the network structure optimizer according to the performance parameter includes: determining an accuracy rate of the optimized network structure relative to the network structure of the neural network according to the optimized network structure and the network structure of the neural network, and using the accuracy rate as the performance parameter of the optimized network structure; constructing a loss function of the network structure optimizer based on the performance parameter; and updating the parameter of the network structure optimizer until the loss function converges.

When determining a value of the loss function of the network structure optimizer based on the accuracy rate of the optimized network structure relative to the network structure of the neural network, the server may determine whether the value of the loss function exceeds a preset threshold. When the value of the loss function exceeds the preset threshold, error information of the network structure optimizer is determined based on the loss function, the error information is backpropagated in the network structure optimizer, and a model parameter of each layer is updated during propagation.

The backpropagation is described herein. Training sample data is inputted into an input layer of a neural network model, passes through a hidden layer, and finally reaches an output layer, and a result is outputted, which is a forward propagation process of the neural network model. Because there is an error between the output result of the neural network model and an actual result, an error between the output result and an actual value is calculated, and the error is backpropagated from the output layer to the hidden layer until the error is propagated to the input layer. During backpropagation, a value of a model parameter is adjusted according to the error. The foregoing process is continuously iterated until convergence is achieved, where the network structure optimizer pertains to the neural network model.

Hereto, the method for constructing a network structure optimizer provided in the embodiments of this application has been described below with reference to the exemplary application and implementation of the server provided in this embodiment of this application. A solution to which modules in the apparatus 555 for constructing a network structure optimizer provided in the embodiments of this application cooperate to construct a network structure optimizer continues to be described below.

A first extraction module 5551 is configured to perform feature extraction on a network structure of a neural network by using a network structure optimizer, to obtain feature information corresponding to the network structure.

A first prediction module 5552 is configured to predict the feature information by using the network structure optimizer, to determine a plurality of optimization manners for the network structure.

A first optimization module 5553 is configured to update the network structure of the neural network according to the optimization manners for the network structure, to obtain an optimized network structure.

A training module 5554 is configured to determine a performance parameter of the optimized network structure, and update a parameter of the network structure optimizer according to the performance parameter, the network structure optimizer being configured to optimize the network structure of the neural network.

In some embodiments, the first extraction module 5551 is further configured to: establish a directed graph for the network structure of the neural network by using the network structure optimizer; and perform feature extraction on the directed graph, to obtain the feature information corresponding to the network structure.

In some embodiments, the first extraction module 5551 is further configured to: perform sampling processing on the network structure of the neural network by using the network structure optimizer, to obtain network layer information for the network structure; and establish the directed graph for the network structure according to the network layer information.

In some embodiments, the first extraction module 5551 is further configured to: determine an input feature or an output feature in the network layer information as node information in the directed graph; determine operation information in the network layer information as edge information in the directed graph; and establish the directed graph for the network structure according to the node information and the edge information, the operation information including at least one of the following: a convolution operation, a skip connection operation, a pooling operation, and a null connection operation.

In some embodiments, the first extraction module 5551 is further configured to: determine node information and edge information in the directed graph; and determine the feature information corresponding to the network structure according to learnable parameter matrixes and an activation function in a GCN, the node information, and the edge information.

In some embodiments, the first extraction module 5551 is further configured to: perform a multiplication operation on the edge information, the node information, and a learnable parameter matrix in a first-layer GCN, to obtain an output of the first-layer GCN; perform nonlinear transformation on the output of the first-layer GCN by using the activation function in the GCN, to obtain a transformed output of the first-layer GCN; perform a multiplication operation on the transformed output of the first-layer GCN and a learnable parameter matrix in a second-layer GCN, to obtain an output of the second-layer GCN; and perform a multiplication operation on the output of the second-layer GCN, the edge information, and a learnable parameter matrix of a fully-connected layer in the GCN, to obtain the feature information corresponding to the network structure.

In some embodiments, the first prediction module 5552 is further configured to: classify the feature information by using the network structure optimizer, and determine probabilities corresponding to the optimization manners of the network structure; and determine, according to the probabilities of the optimization manners of the network structure, optimization manners for the network structure that meet a probability requirement in the plurality of optimization manners.

In some embodiments, the first optimization module 5553 is further configured to: determine operation information, sizes of network layers, and a quantity of network layers in the optimization manners; and replace operation information, sizes of network layers, and a quantity of network layers in the network structure of the image recognition neural network with the operation information, the sizes of the network layers, and the quantity of network layers in the optimization manners, to obtain the optimized network structure, the sizes of the network layers including at least one of the following: a size of a convolution kernel and a size of a pooling layer.

In some embodiments, the training module 5554 is further configured to: respectively visualize the optimized network structure and the network structure of the neural network, to obtain visualization results corresponding to the optimized network structure and the network structure of the neural network; and use, in response to an adjustment operation corresponding to the visualization results, the adjustment operation as the image recognition performance parameter of the optimized network structure.

In some embodiments, the training module 5554 is further configured to: determine an accuracy rate of the optimized network structure relative to the network structure of the image recognition neural network according to the optimized network structure and the network structure of the image recognition neural network, and use the accuracy rate as the image recognition performance parameter of the optimized network structure; construct a loss function of the network structure optimizer based on the image recognition performance parameter; and update the parameter of the network structure optimizer until the loss function converges.

Figures 4, 5:
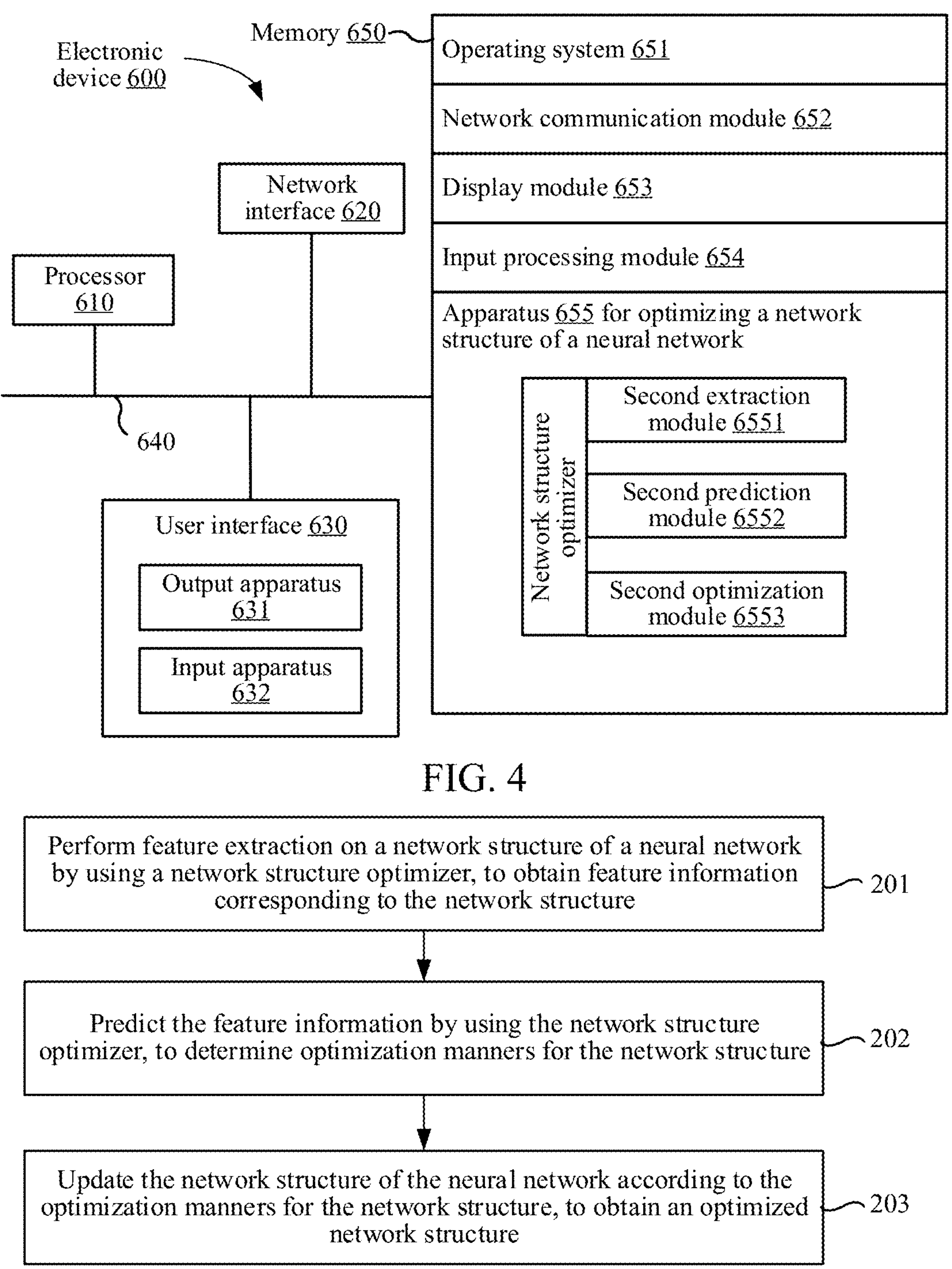
FIG. 4 is a schematic structural diagram of an electronic device 600 configured to optimize a network structure of a neural network according to an embodiment of this application.
FIG. 5 is a schematic flowchart of a method for optimizing a network structure of a neural network according to an embodiment of this application.

A method for optimizing a network structure of a neural network and an electronic device configured to optimize a network structure of a neural network that are provided in the embodiments of this application are described below based on the foregoing description of the method for constructing a network structure optimizer and the structure. FIG. 4 is a schematic structural diagram of an electronic device 600 configured to optimize a network structure of a neural network according to an embodiment of this application. The electronic device 600 configured to optimize a network structure of a neural network shown in FIG. 4 includes: at least one processor 610, a memory 650, at least one network interface 620, a user interface 630, and a bus system 640. Functions of the processor 610, the memory 650, the at least one network interface 620, the user interface 630, and the bus system 640 are similar to functions of the processor 510, the memory 550, the at least one network interface 520, the user interface 530, and the bus system 540 respectively. That is, functions of an output apparatus 631 and an input apparatus 632 are similar to functions of the output apparatus 531 and the input apparatus 532, and functions of an operating system 651, a network communication module 652, a display module 653, and an input processing module 654 are similar to functions of the operating system 551, the network communication module 552, the display module 553, and the input processing module 554. Details are not described again.

In some other embodiments, the apparatus for optimizing a network structure of a neural network provided in the embodiments of this application may be implemented in a manner of software. FIG. 4 shows an apparatus 655 for optimizing a network structure of a neural network stored in the memory 650, which may be software in the form of a program, a plug-in, or the like and includes a series of modules, including a second extraction module 6551, a second prediction module 6552, and a second optimization module 6553, where the second extraction module 6551, the second prediction module 6552, and the second optimization module 6553 are configured to implement the method for optimizing a network structure of a neural network provided in the embodiments of this application.

It may be understood according to the above that the method for optimizing a network structure of a neural network provided in the embodiments of this application may be implemented by various types of electronic devices configured to optimize a network structure of a neural network, for example, a smart terminal and a server.

The method for optimizing a network structure of a neural network provided in the embodiments of this application is described below with reference to an exemplary application and implementation of the server provided in this embodiment of this application. FIG. 5 is a schematic flowchart of a method for optimizing a network structure of a neural network according to an embodiment of this application, which is described with reference to steps shown in FIG. 5.

In step 201, feature extraction is performed on a network structure of a neural network by using a network structure optimizer, to obtain feature information corresponding to the network structure.

In some embodiments, the performing feature extraction on a network structure of a neural network by using a network structure optimizer, to obtain feature information corresponding to the network structure includes: establishing a directed graph for the network structure of the neural network by using the network structure optimizer; and performing feature extraction on the directed graph, to obtain the feature information corresponding to the network structure.

In some embodiments, the establishing a directed graph for the network structure of the neural network by using the network structure optimizer includes: performing sampling processing on the network structure of the neural network by using the network structure optimizer, to obtain network layer information for the network structure; and establishing the directed graph for the network structure according to the network layer information.

In some embodiments, the establishing the directed graph for the network structure according to the network layer information includes: determining an input feature or an output feature in the network layer information as node information in the directed graph; determining operation information in the network layer information as edge information in the directed graph; and establishing the directed graph for the network structure according to the node information and the edge information, the operation information including at least one of the following: a convolution operation, a skip connection operation, a pooling operation, and a null connection operation.

In some embodiments, the performing feature extraction on the directed graph, to obtain the feature information corresponding to the network structure includes: determining node information and edge information in the directed graph; and determining the feature information corresponding to the network structure according to learnable parameter matrixes and an activation function in a GCN, the node information, and the edge information.

In some embodiments, the determining the feature information corresponding to the network structure according to learnable parameter matrixes and an activation function in a GCN, the node information, and the edge information includes: performing a multiplication operation on the edge information, the node information, and a learnable parameter matrix in a first-layer GCN, to obtain an output of the first-layer GCN; performing nonlinear transformation on the output of the first-layer GCN by using the activation function in the GCN, to obtain a transformed output of the first-layer GCN; performing a multiplication operation on the transformed output of the first-layer GCN and a learnable parameter matrix in a second-layer GCN, to obtain an output of the second-layer GCN; and performing a multiplication operation on the output of the second-layer GCN, the edge information, and a learnable parameter matrix of a fully-connected layer in the GCN, to obtain the feature information corresponding to the network structure.

In step 202, the feature information is predicted by using the network structure optimizer, and optimization manners for the network structure are determined.

In some embodiments, the predicting the feature information by using the network structure optimizer, to determine optimization manners for the network structure includes: classifying the feature information by using the network structure optimizer, and determining probabilities corresponding to the optimization manners of the network structure; and determining, according to the probabilities of the optimization manners of the network structure, optimization manners for the network structure that meet a probability requirement in the plurality of optimization manners.

In step 203, the network structure of the neural network is updated according to the optimization manners for the network structure, to obtain an optimized network structure.

In some embodiments, the updating the network structure of the neural network according to the optimization manners for the network structure, to obtain an optimized network structure includes: determining operation information, sizes of network layers, and a quantity of network layers in the optimization manners; and replacing operation information, sizes of network layers, and a quantity of network layers in the network structure of the neural network with the operation information, the sizes of the network layers, and the quantity of network layers in the optimization manners, to obtain the optimized network structure, the sizes of the network layers including at least one of the following: a size of a convolution kernel and a size of a pooling layer; and Hereto, the method for optimizing a network structure of a neural network provided in the embodiments of this application have been described. A solution to which the modules in the apparatus 655 for optimizing a network structure of a neural network provided in the embodiments of this application cooperate to optimize a network structure of a neural network continues to be described below.

The second extraction module 6551 is configured to perform feature extraction on a network structure of a neural network by using a network structure optimizer, to obtain feature information corresponding to the network structure.

The second prediction module 6552 is configured to predict the feature information by using the network structure optimizer, and determine optimization manners for the network structure.

The second optimization module 6553 is configured to update the network structure of the neural network according to the optimization manners for the network structure, to obtain an optimized network structure.

The foregoing description related to the apparatus is similar to the description of the foregoing method. For the description of beneficial effects of the same methods, details are not described again. For technical details of the apparatus not disclosed in the embodiments of this application, refer to the description of the method embodiments in this application.

The following describes an exemplary application of this embodiment of this application in an actual application scenario.

DL based on a DNN has attracted wide attention from the academia and industry, and has gained breakthrough results in many application fields, including image recognition, target detection, semantic segmentation, speech recognition, natural language processing, and the like. Currently, the network structures of the neural network mainly comes from two design methods. One is that people manually designs the structure of the neural network by using existing experience, and the other is that a computer searches for the network structure in an automatic manner by using a neural network structure search technology. However, the neural networks designed by using the two methods still have some redundant calculation units or calculation operations. The redundancy not only increases calculation costs, but also reduces the performance of a model designed based on the network structure. The problems limit the performance of the DNN model in an actual application scenario and the application of the DNN model on a computing platform with limited resources. Therefore, it is necessary to optimize the network structure without introducing additional calculation costs to improve the performance. To resolve the foregoing problems, an optimization problem is converted into a Markov decision process (MDP), and an operation with higher calculation efficiency (such as a skip connection or a direct removal connection) is calculated to replace a redundant operation. Network address translation is trained through reinforcement learning, to obtain optimization strategies for different structures.

To resolve the foregoing problems, efficient neural architecture search (ENAS) improves the efficiency of the network structure search based on the NAS model by using a weight sharing technology. In the ENAS, it is assumed that each network structure generated by a controller each time is a subgraph of a large DAG, each edge in the subgraph has a corresponding weight, and the weights are shared by all subgraphs. For example, as shown in FIG. 9, FIG. 9 is a schematic structural diagram of a DAG in a neural network according to an embodiment of this application. FIG. 9 shows a DAG including 7 nodes, and each node represents a computing node, which may process transmitted information; and a connection between the nodes represents a method for transmitting information. The connection between the nodes and an operation of the node on an input are obtained through sampling by the controller, nodes "−2" and "−1" in FIG. 9 represent two input nodes, nodes {0, 1, 2, 3} represent intermediate nodes, and "output" represents an output node. The connection between the nodes represents a connection relationship, and each connection has an operation (such as a convolution operation or a pooling operation). All weights required for the operations are shared for any subnetwork. That is, provided that a specific network uses a connection between i and j, all weights used for any operation of information transmitted to the node j (for example, a convolution operation by a convolution kernel of 3*3) are the same. The weights are a part of model parameters, and are optimized during training.

Network structure automatic compression: In an automatic compression method, parameters such as sizes of convolution kernels and a quantity of convolution kernels in a convolutional layer are mainly adjusted, to implement model compression. For example, the quantity of convolution kernels may be automatically learned, and redundant convolution kernels may be removed, to implement model compression.

Figure 10:
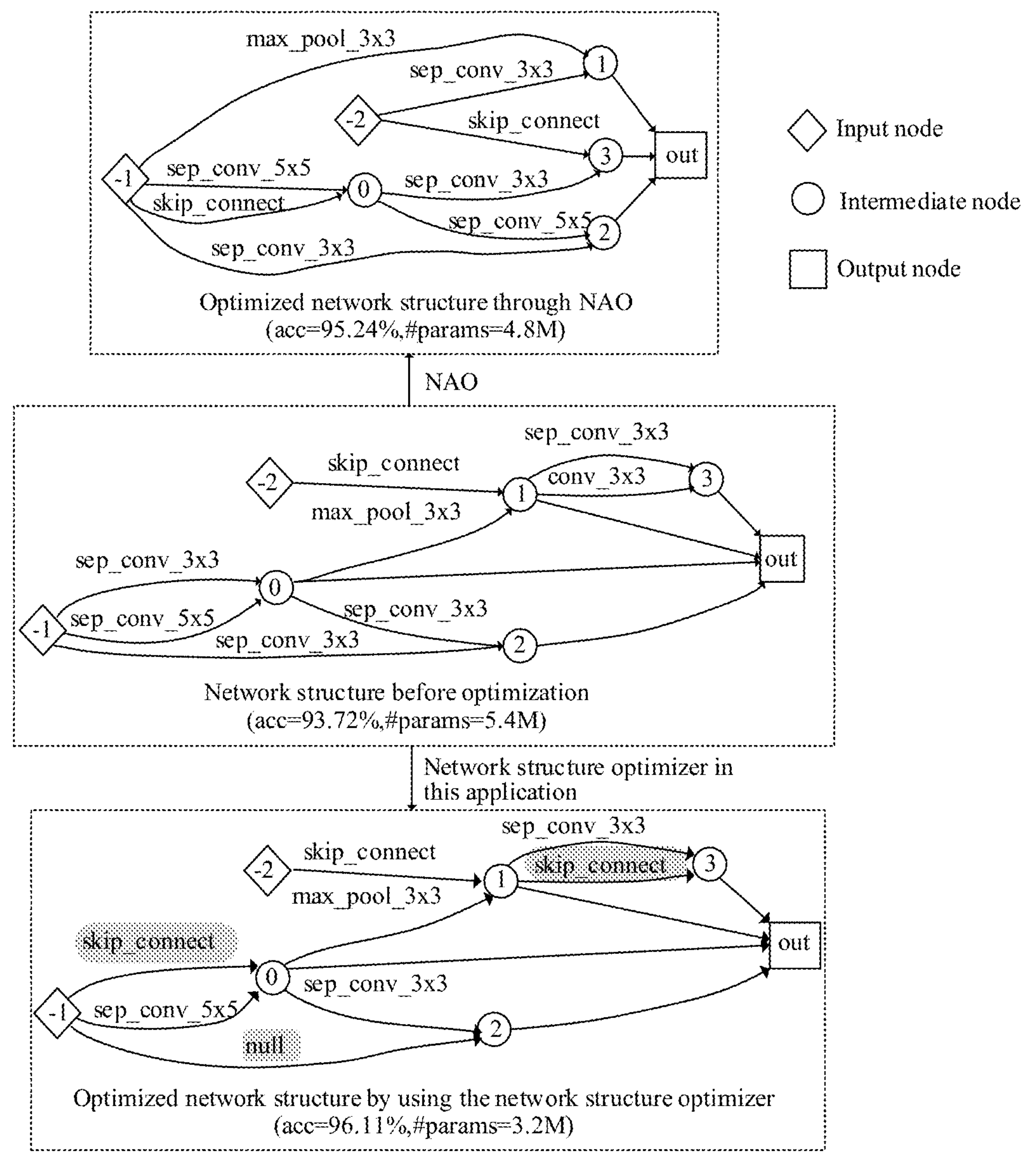
FIG. 10 is a schematic diagram of a comparison of optimizing network structures according to an embodiment of this application.

To optimize the network structure, one network structure may be encoded into an embedding vector in a continuous space by using an NAO method, gradient descent is then performed to obtain a better embedding vector, and the embedding vector is mapped back to a network structure (that is, an optimized network structure) by using a decoder. However, as shown in FIG. 10, FIG. 10 is a schematic diagram of a comparison of optimizing network structures according to an embodiment of this application. In the NAO method, a network structure completely different from that of an input is often generated, and additional parameters or additional calculation costs are introduced. The NAO method has the same search space as other network structure automatic searching methods, and has a relatively large search space, which makes it difficult to train a model.

Each network structure obtained by using an existing network structure design method includes many redundant calculation operations, and the redundancy causes the model to introduce high calculation costs and affect the performance of the model. Therefore, operations in the network structure may be optimized to reduce the redundancy and improve the performance. For the network structure automatic compression method, only sizes of convolution kernels and a quantity of convolution kernels can be modified, but types of the operations cannot be modified, thereby greatly limiting the optimization of the network structure.

The network structure optimizer provided in the embodiments of this application may automatically optimize different network structures according to any given network structure as an input, to reduce the redundancy of the model and improve the performance of the model. As shown in FIG. 11A, FIG. 11A is a schematic structural diagram of a system according to an embodiment of this application. A network structure optimizer is trained to optimize any network structure, so that the optimized network structure has better performance than an original network structure, while it is ensured that no additional calculation overheads are added.

Figure 11B:
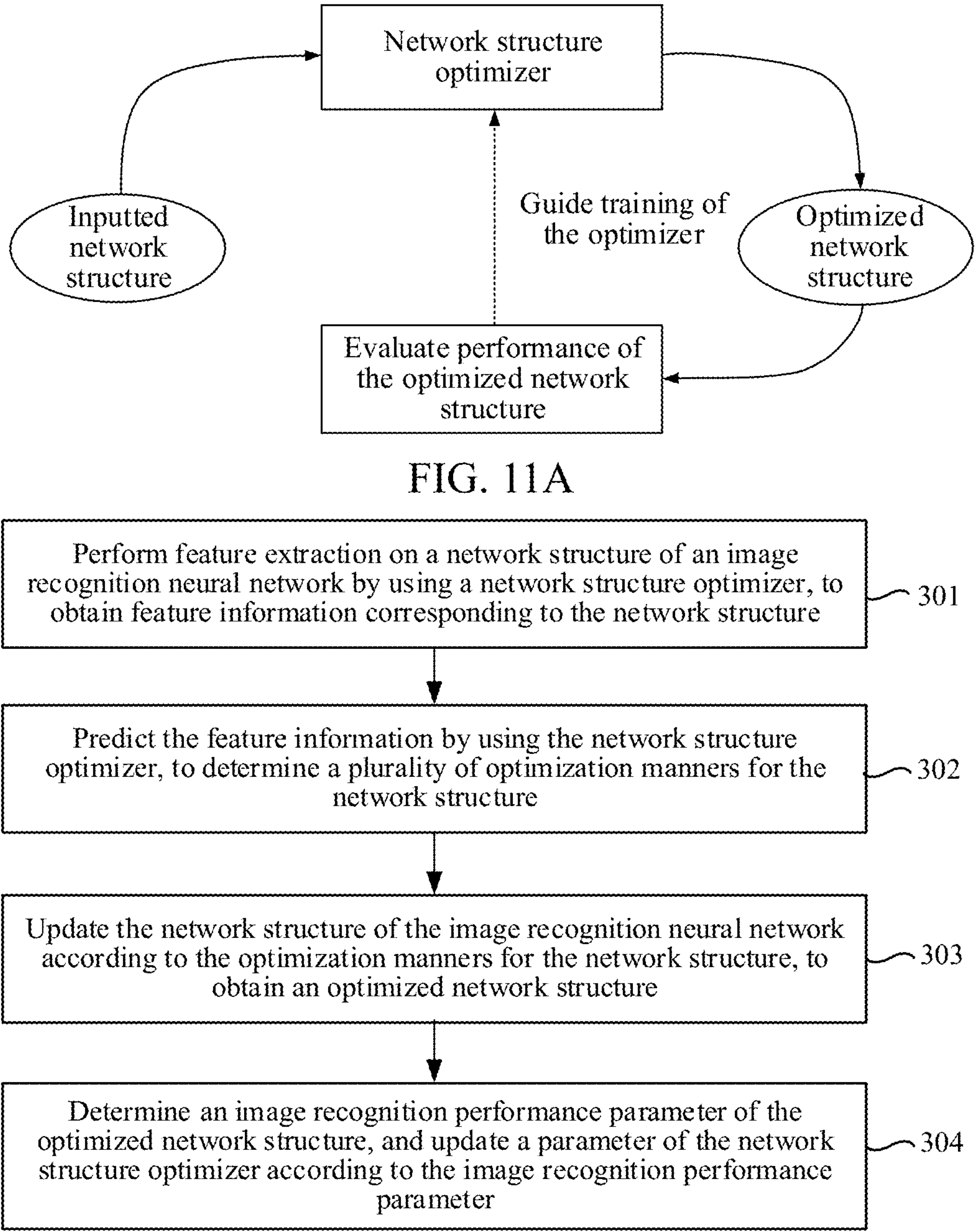
FIG. 11B is a schematic flowchart of a method for constructing a network structure optimizer according to an embodiment of this application.

FIG. 11B is a schematic flowchart of a method for constructing a network structure optimizer according to an embodiment of this application, which is described with reference to steps shown in FIG. 11B.

In step 301, feature extraction is performed on a network structure of an image recognition neural network by using a network structure optimizer, to obtain feature information corresponding to the network structure; in step 302, the feature information is predicted by using the network structure optimizer, to determine a plurality of optimization manners for the network structure; in step 303, the network structure of the image recognition neural network is updated according to the optimization manners for the network structure, to obtain an optimized network structure; and in step 304, an image recognition performance parameter of the optimized network structure is determined, and a parameter of the network structure optimizer is updated according to the image recognition performance parameter, the network structure optimizer being configured to optimize the network structure of the image recognition neural network.

That is, a process of training the network structure optimizer in this embodiment of this application is as follows:

1) For an inputted network structure, feature information of the network structure is first extracted, and is used for subsequent optimization manners of the network structure optimizer. The network structure optimizer calculates a probability that each calculation operation in the network structure may be replaced with a different optional operation, and then performs sampling according to a probability value to obtain an optimal optimization manner of the network structure.
2) The network structure optimizer generates a plurality of possible candidate network structures according to the optimization manners, and all the network structures are better network structures determined by the network structure optimizer.
3) For each candidate network structure, performance evaluation is performed and the network structure optimizer is guided for training.

Figure 11C:
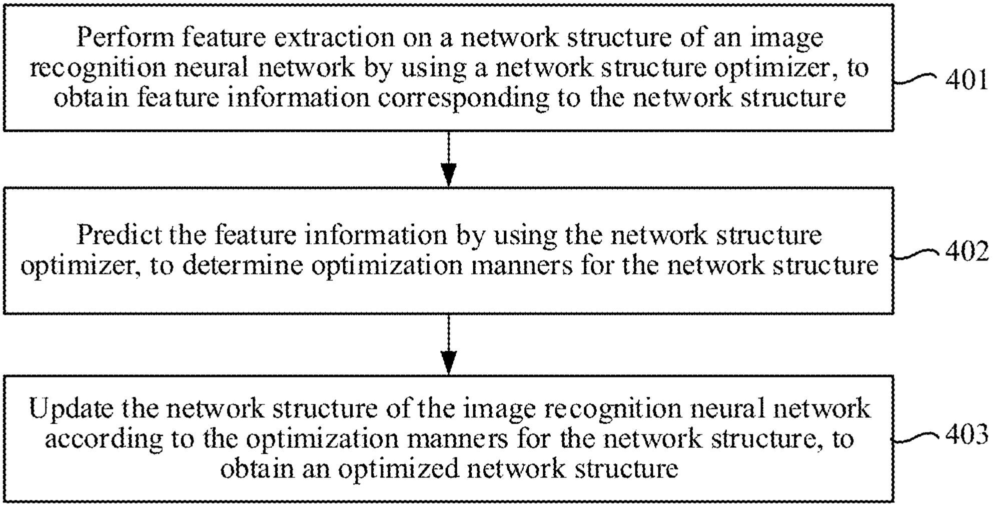
FIG. 11C is a schematic flowchart of a method for optimizing a network structure of an image recognition neural network according to an embodiment of this application.

FIG. 11C is a schematic flowchart of a method for optimizing a network structure of an image recognition neural network according to an embodiment of this application, which is described with reference to steps shown in FIG. 11C. The method for optimizing a network structure of an image recognition neural network is applicable to the foregoing trained network structure optimizer.

In step 401, feature extraction is performed on a network structure of an image recognition neural network by using a network structure optimizer, to obtain feature information corresponding to the network structure; in step 402, the feature information is predicted by using the network structure optimizer, and optimization manners for the network structure are determined; and in step 403, the network structure of the image recognition neural network is updated according to the optimization manners for the network structure, to obtain an optimized network structure, the optimized network structure being used for performing an image recognition task.

That is, a process of optimizing the network structure by using the network structure optimizer in this embodiment of this application is as follows:

1) For an inputted network structure, feature information of the network structure is first extracted, and is used for subsequent optimization manners of the network structure optimizer.
2) The network structure optimizer generates a plurality of possible candidate network structures according to the optimization manners, and all the network structures are better network structures determined by the network structure optimizer.
3) The performance of each candidate network is evaluated on a verification set, an optimal network structure is invoked as a network structure suitable for this dataset, to complete the optimization of the network structure.

A method for performing feature extraction on a network structure is as follows:

In some embodiments, a directed graph for the network structure of the image recognition neural network is established by using the network structure optimizer; and feature extraction is performed on the directed graph, to obtain the feature information corresponding to the network structure, sampling processing being performed on the network structure of the image recognition neural network by using the network structure optimizer, to obtain network layer information for the network structure; and the directed graph for the network structure being established according to the network layer information. For example, an input feature or an output feature in the network layer information is determined as node information in the directed graph; operation information in the network layer information is determined as edge information in the directed graph; and the directed graph for the network structure is established according to the node information and the edge information, the operation information including at least one of the following: a convolution operation, a skip connection operation, a pooling operation, and a null connection operation.

Figure 12:
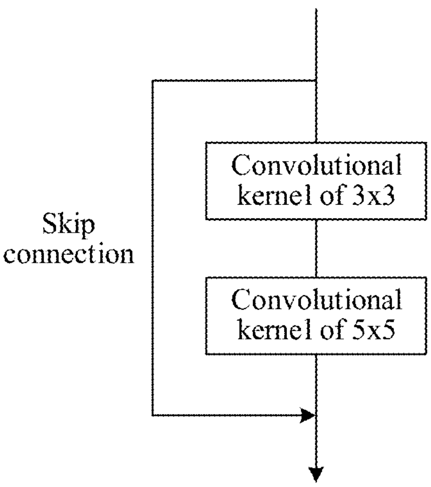
FIG. 12 is a schematic diagram of a network structure according to an embodiment of this application.
Figures 13, 14, 15:
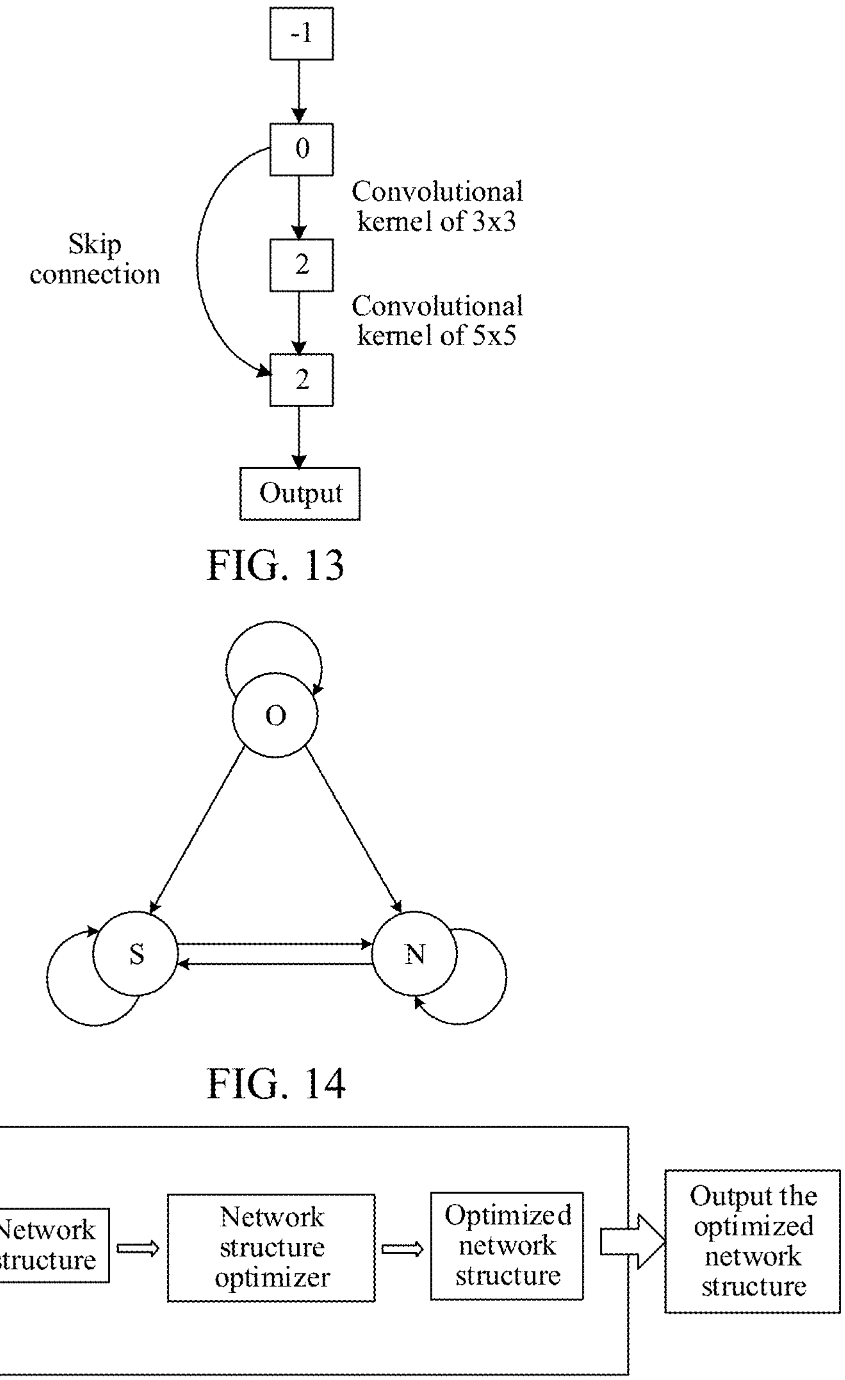
FIG. 13 is a schematic diagram of a directed graph that corresponds to a network structure and is for representation according to an embodiment of this application.
FIG. 14 is a schematic diagram of an operation conversion rule in a network structure according to an embodiment of this application.
FIG. 15 is a schematic flowchart of an automated machine learning (AutoML) product according to an embodiment of this application.

As shown in FIG. 12, FIG. 12 is a schematic diagram of a network structure according to an embodiment of this application. As shown in FIG. 13, FIG. 13 is a schematic diagram of a directed graph that corresponds to a network structure and is for representation according to an embodiment of this application. The network structure in FIG. 12 is converted into the directed graph in FIG. 13 for representation. It can be learned from FIG. 13 that an input feature or an output feature of a network layer (network layer information) is represented by a node (a grid with a number marking) in the directed graph, and an operation of the network layer (such as a skip connection of a convolution kernel of 3×3 (conv_3×3)) is represented by a connection between the nodes in a graph structure. Therefore, the representation of the directed graph may completely reserve information in the network structure.

To implement that the network structure obtained by optimizing the network structure has lower calculation complexity, each operation in the network structure may be replaced in a manner shown in FIG. 14 (by using optimization manners). FIG. 14 is a schematic diagram of an operation conversion rule in a network structure according to an embodiment of this application. In FIG. 14, O represents other calculation operations than a skip connection operation and a null connection operation, and the operations include a convolution operation, a pooling operation, and the like; S represents a skip connection, that is, the skip connection operation; and N represents a null connection, that is, no calculation operation. A magnitude relationship between calculation costs in FIG. 14 is $c(O)>c(S)>c(N)$, where c(.) represents a function for measuring the calculation costs. The calculation operations O may be changed into the skip connection S or the null connection N, and the skip connection S may be changed into the null connection N. Although the operation S has slightly higher calculation costs than the operation N, the skip connection S often brings substantial performance improvement. Therefore, in this embodiment of this application, the operation N is also allowed to be changed into S.

A method for training the network structure optimizer is as follows:

1) Feature extraction is performed, by using a graph convolutional neural network, on a network structure represented by using a directed graph. For example, node information and edge information in the directed graph are determined, feature information corresponding to the network structure is determined according to learnable parameter matrixes and an activation function in the GCN, the node information, and the edge information, and a probability that each operation may be replaced with an optional operation is calculated. In this embodiment of this application, a GCN including two layers is used. For example, a multiplication operation is performed on the edge information, the node information, and a learnable parameter matrix in a first-layer GCN, to obtain an output of the first-layer GCN; nonlinear transformation is performed on the output of the first-layer GCN by using the activation function in the GCN, to obtain a transformed output of the first-layer GCN; a multiplication operation is performed on the transformed output of the first-layer GCN and a learnable parameter matrix in a second-layer GCN, to obtain an output of the second-layer GCN; and a multiplication operation is performed on the output of the second-layer GCN, the edge information, and a learnable parameter matrix of a fully-connected layer in the GCN, to obtain the feature information corresponding to the network structure. A calculation formula is shown in Formula (1):

$$Z = f(X, A) = \mathrm{Softmax}\left(A\sigma\left(AXW^{(0)}\right)W^{(1)}W^{FC}\right) \quad (1)$$

X represents the input feature (the node information) of graph structure data, and A represents an adjacency matrix (the edge information) of the graph structure, a Softmax function is used for representing probabilities of generating different possible optimization manners, a σ function represents a specific activation function (for example, a rectified linear unit (ReLU)), $W^{(0)}$ and $W^{(1)}$ represent parameters of the first-layer GCN and the second-layer GCN respectively, and $W^{FC}$ represents a parameter of a last fully-connected layer of the GCN, where $\{W^{(0)}, W^{(1)}, W^{FC}\}$ are trainable parameters.

In some embodiments, the predicting the feature information by using the network structure optimizer, to determine a plurality of optimization manners for the network structure includes: classifying the feature information by using the network structure optimizer, and determining probabilities corresponding to the optimization manners of the network structure; and determining, according to the probabilities of the optimization manners of the network structure, optimization manners for the network structure that meet a probability requirement in the plurality of optimization manners.

For the method for performing feature extraction on the network structure, feature extraction may be further performed by using a long short-term memory (LSTM) of a recurrent neural network (RNN) in addition to the GCN. That is, the graph data representing the optimized network structure may be represented by using a sequence of character strings, each character in the character string is then predicted one by one by using the LSTM of the RNN, and types of different operations in the network structure may alternatively be replaced and optimized. This application is not limited to the GCN and the LSTM of the RNN, and other neural networks may alternatively perform feature extraction on the network structure.

2) A specified network structure $\hat{\beta}$ is inputted, to obtain a better network structure α. The following objective function may be optimized, as shown in Formula (2):

$$\max_{\alpha} R\left(\alpha \mid \hat{\beta}\right),\ c(\alpha) \le k \quad (2)$$

$R(\alpha|\hat{\beta})$ represents a difference in performance (performance is generally measured by using an accuracy rate) of the optimized structure α obtained by giving the inputted network structure $\hat{\beta}$, c(.) represents a function for measuring calculation costs, and k represents a specific constant that limits an upper limit of the calculation costs. The maximization of the difference in performance may optimize the network structure while ensuring that the calculation costs are within an acceptable range.

The updating the network structure of the image recognition neural network according to the optimization manners for the network structure, to obtain an optimized network structure includes: determining operation information, sizes of network layers, and a quantity of network layers in the optimization manners; and replacing operation information, sizes of network layers, and a quantity of network layers in the network structure of the image recognition neural network with the operation information, the sizes of the network layers, and the quantity of network layers in the optimization manners, to obtain the optimized network structure, the sizes of the network layers including at least one of the following: a size of a convolution kernel and a size of a pooling layer.

When a plurality of different network structures are inputted as training data, to ensure that the optimizer proposed in this embodiment of this application can optimize any network structure, an objective function is optimized as shown in Formula (3):

$$\max_{\theta} E_{\beta\sim p(.)}[E_{\alpha\sim\pi(.|\beta;\theta)}R(\alpha \mid \beta)],\ c(\alpha) \le k,\ \alpha\sim\pi(. \mid \beta; \theta) \quad (3)$$

β represents a network structure variable, and represents a specific inputted network structure, p(.) represents a specific distribution of the network structure, $\pi(.|\beta;\theta)$ represents an optimization strategy of a given β and a parameter θ, α represents an optimized network structure variable, and $R(\alpha|\beta)$ represents a difference in performance (performance is generally measured by using an accuracy rate) of the optimized structure α obtained by giving the inputted network variable β.

It can be learned from the formula that in this embodiment of this application, the objective function is affected by a model performance improvement value. That is, the evaluation performance of the optimized network structure can guide the training of the network structure optimizer.

During actual training, the foregoing objective function may be implemented by sampling, and the objective function is rewritten into a form shown in Formula (4):

$$J(\theta) = E_{\beta\sim p(.)}[E_{\alpha\sim\pi(.|\beta;\theta)}[R(\alpha, w) - R(\beta, w)] + \lambda H(\pi(. \mid \beta; \theta))] = \quad (4)$$

-continued $$\sum_{\beta} p(\beta)\left[\sum_{a} \pi(\alpha \mid \beta;\ \theta)(R(\alpha,\ w) - R(\beta,\ w)) + \lambda H(\pi(. \mid \beta;\ \theta))\right]$$

$\pi(\alpha|\beta;\theta)$ represents a probability that $\alpha$ is sampled when an inputted network structure $\beta$ and a parameter $\theta$ of the optimizer are given, $(R(\alpha,w)$ represents the model performance of the network structure $\alpha$ under a model parameter w, $H(\pi(.|\beta;\theta))$ represents entropy of an optimization method $\pi(.|\beta;\theta)$, and $\lambda$ is a constant for adjusting a weight.

The network structure optimizer is updated by using a gradient descent method. A gradient of the parameter of the network structure optimizer may be calculated by using the following formula (5):

$$\nabla_{\theta} J(\theta) \approx \frac{1}{mn}\sum_{i=1}^{m}\sum_{j=1}^{n}[\nabla_{\theta}\log\pi(\alpha_j \mid \beta_i;\ \theta)(R(\alpha_j,\ w) - R(\beta,\ w)) + \lambda H(\pi(. \mid \beta;\ \theta))] \tag{5}$$

3) The optimization step 2) iterates until the convergence of the network structure optimizer ends.

Through the foregoing steps, the network structure optimizer may process enough network structures, and the capability of optimizing any network structure by the network structure optimizer is improved by using the objective function in the optimization step 2). After the training of the network structure optimizer is completed, the step of optimizing the network structure may be performed, to complete the optimization of the network structure.

In this embodiment of this application, network structure may be automatically optimized according to a network structure inputted by the user in an AutoML product, to obtain a network structure having lower calculation costs and better performance, so as to meet requirements of different application scenarios and implement a better "automated" user experience function.

FIG. 15 is a schematic flowchart of an AutoML product according to an embodiment of this application. In an application scenario of image recognition, a user only needs to prepare a neural network structure required for a related service, and input the neural network structure into the network structure optimizer proposed in this application, and an optimized network structure is automatically generated to optimize the network structure. That is, the performance of the network structure is improved without introducing additional calculation costs or reducing calculation costs. In this embodiment of this application, the network structure optimizer optimizes any network structure provided by the user. A procedure is as follows: 1) A user uploads any neural network structure to an AutoML platform; 2) feature information is extracted on the inputted network structure; 3) the AutoML platform obtains a better network structure based on the extracted feature information; and 4) the network structure is outputted for the user to use.

In this embodiment of this application, the network structure optimizer is applicable to a manually designed neural network and NAS, and performs verification on two reference image classification datasets (a CIFAR-10 dataset and an ImageNet dataset).

Two network structures, namely, a network structure of a calculation module and a network structure of a downsampling module, in a DNN are considered. The network structure of the calculation module reserves a space size of the inputted network structure, while the network structure of the downsampling module reduces a space of the inputted network structure by 2 times. Both the network structure of the calculation module and the network structure of the downsampling module include 2 input nodes and a plurality of intermediate nodes.

Figure 16:
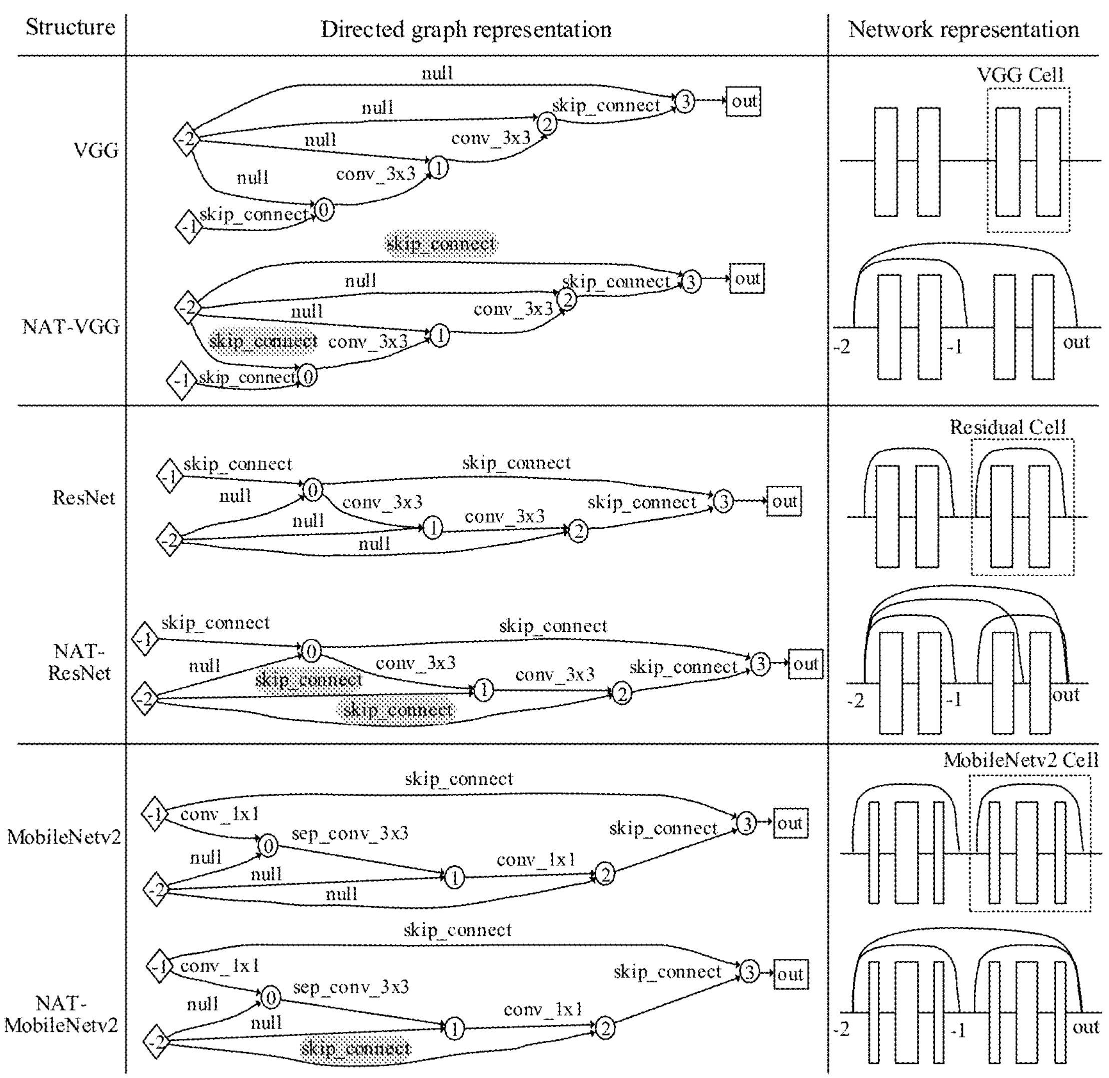
FIG. 16 is a schematic diagram of a directed graph representation and a network representation of a network structure of a calculation module and a network structure of a downsampling module according to an embodiment of this application.

The network structure optimizer (NAT) is applicable to three manually designed neural networks (a VGG network, a ResNet, and MobileNet) to perform an image recognition task. To make all architectures share the same graph structure representation method, null connections may be added to the manually designed neural networks, to ensure that each node include two input nodes. For a fair comparison, the DNN is constructed by using the network structure of the calculation module and the network structure of the downsampling module, while depths and a quantity of channels the same as that of an original model are maintained. As shown in Table 1, the NAT always outperforms the original model. In addition, FIG. 16 shows architectures of a network structure of a calculation module and a network structure of a downsampling module. FIG. 16 is a schematic diagram of a directed graph representation and a network representation of a network structure of a calculation module and a network structure of a downsampling module according to an embodiment of this application. The results show that the NAT can improve the manually designed neural network through optimization without introducing additional calculation connections. It can be learned from Table 1 that although the NAO model has better performance than the original model, the NAO model has more parameters and higher calculation costs. In contrast, the NAT-VGG, the NAT-ResNet and the NAT-MobileNetV2 obviously outperform the original model. Acc.(%) represents an average accuracy rate of five random experiments, #Params(M) represents a quantity of parameters, #MAdds(M) represents a quantity of addition and multiplication operations during calculation, M represents an order of one million, and "/" represents a non-optimized original model.

TABLE 1

CIFAR-10

| Model | Method | # Params(M) | # MAdds(M) | Acc.(%) |
|---|---|---|---|---|
| VGG16 | / | 15.2 | 313 | 93.56 |
| | NAO | 19.5 | 548 | 95.72 |
| | NAT | 15.2 | 313 | 96.04 |
| ResNet20 | / | 0.3 | 41 | 91.37 |
| | NAO | 0.4 | 61 | 92.44 |
| | NAT | 0.3 | 41 | 92.95 |
| ResNet56 | / | 0.9 | 127 | 93.21 |
| | NAO | 1.3 | 199 | 95.27 |
| | NAT | 0.9 | 127 | 95.40 |
| MobileNetV2 | / | 2.3 | 91 | 94.47 |
| | NAO | 2.9 | 131 | 94.75 |
| | NAT | 2.3 | 91 | 95.17 |

ImageNet

| Model | Method | # Params(M) | # MAdds(M) | Acc.(%) | |
|---|---|---|---|---|---|
| | | | | Top-1 | Top-5 |
| VGG16 | / | 138.4 | 15620 | 71.6 | 90.4 |
| | NAO | 147.7 | 18896 | 72.9 | 91.3 |
| | NAT | 138.4 | 15620 | 74.3 | 92.0 |
| ResNet20 | / | 11.7 | 1580 | 69.8 | 89.1 |
| | NAO | 17.9 | 2246 | 70.8 | 89.7 |
| | NAT | 11.7 | 1580 | 71.1 | 90.0 |
| ResNet56 | / | 25.6 | 3530 | 76.2 | 92.9 |

TABLE 1-continued

| | | | | | |
|---|---|---|---|---|---|
| | NAO | 64.8 | 4505 | 77.4 | 93.2 |
| | NAT | 25.6 | 3530 | 77.7 | 93.5 |
| MobileNetV2 | / | 3.4 | 300 | 72.0 | 90.3 |
| | NAO | 4.5 | 513 | 72.2 | 90.6 |
| | NAT | 3.4 | 300 | 72.5 | 91.0 |

Figure 17:
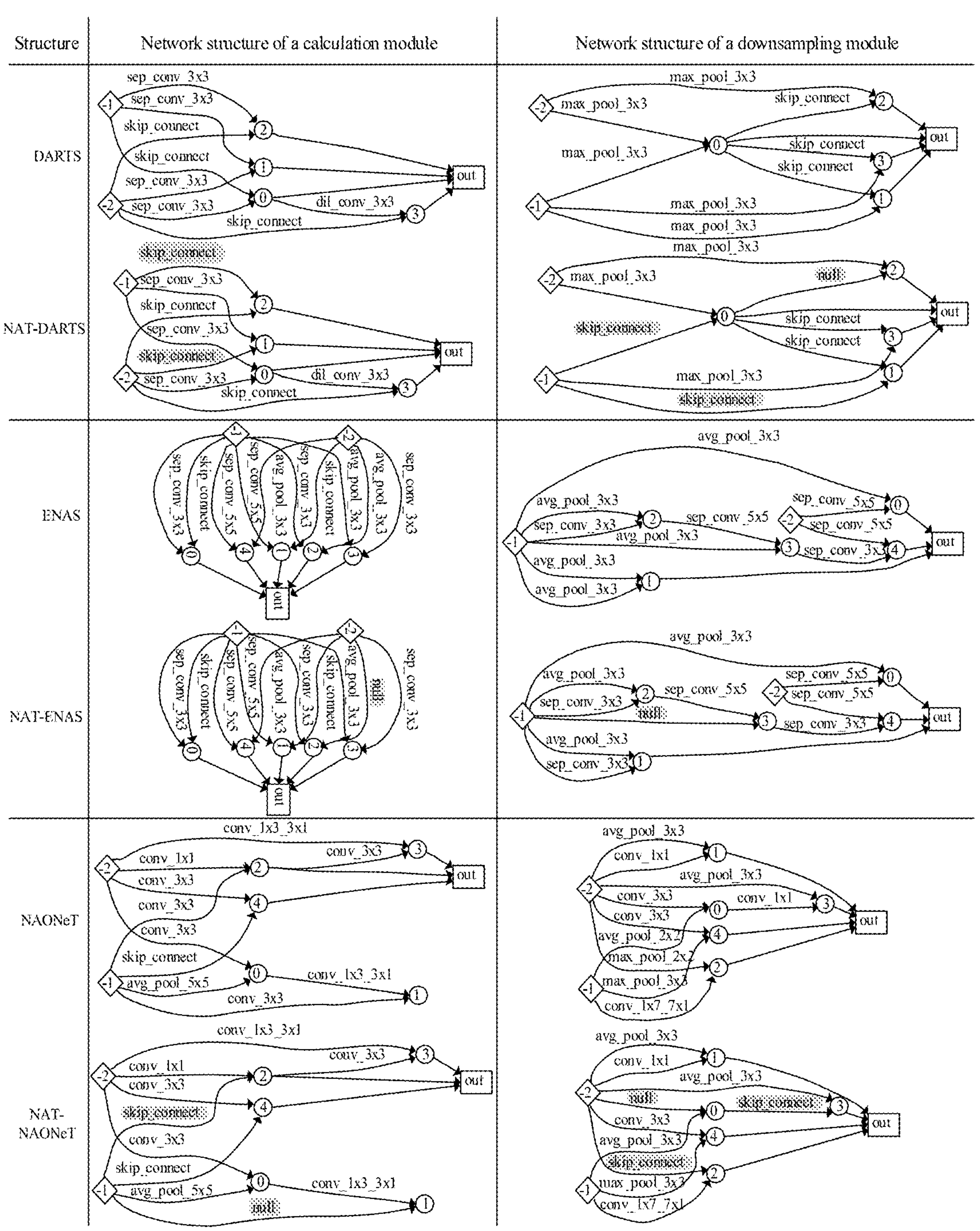
FIG. 17 is a schematic diagram of visualizing a network structure of a calculation module and a network structure of a downsampling module according to an embodiment of this application.

For the NAS architecture, the network structure optimizer (NAT) is applicable to three most advanced NAS-based architectures, and the three architectures are DARTS, NAONet, and ENAS respectively. In addition, the three architectures further compare with other NAS-based architectures, namely, AmoebaNet, PNAS, SNAS, and GHN, as shown in Table 2. It can be learned from Table 2 that compared with a baseline model and a model optimized by using the NAO method, all NAT-based architectures have higher accuracy on the CIFAR-10. Compared with other NAS-based architectures, the NAT-DART has the best performance on the CIFAR-10, and compared with an optimal architecture (that is, the AmoebaNet) on the ImageNet, the NAT-DART has lower calculation costs and fewer parameters, to achieve the competitive performance. The network structure of the calculation module and the network structure of the downsampling module are visualized. As shown in FIG. 17, skip connect represents a skip connection, null represents a null connection, cony represents a convolution kernel, max_pool represents maximum pooling, avg_pool represents average pooling, sep_conv represents depth separable convolution, and dil_conv represents dilated convolution. For the DARTS and the NAONet, the NAT replaces a plurality of redundant operations with the skip connections or directly deletes connections, thereby reducing a quantity of parameters. While the ENAS is optimized, the NAT eliminates the average pooling operation, and improves the performance without introducing additional calculations. Acc.(%) represents an average accuracy rate of five random experiments, #Params(M) represents a quantity of parameters, #MAdds(M) represents a quantity of addition and multiplication operations during calculation, M represents an order of one million, "I" represents a non-optimized original model, and "-" represents an unreported result.

TABLE 2

| CIFAR-10 | | | | |
|---|---|---|---|---|
| Model | Method | # Params(M) | # MAdds(M) | Acc.(%) |
| AmoebaNet | / | 3.2 | — | 96.73 |
| PNAS | | 3.2 | — | 96.67 |
| SNAS | | 2.9 | — | 97.08 |
| GHN | | 5.7 | — | 97.22 |
| ENAS | / | 4.6 | 804 | 97.11 |
| | NAO | 4.5 | 763 | 97.05 |
| | NAT | 4.6 | 804 | 97.24 |
| DARTS | / | 3.3 | 533 | 97.06 |
| | NAO | 3.5 | 577 | 97.09 |
| | NAT | 3.0 | 483 | 97.28 |
| NAONet | / | 128 | 66016 | 97.89 |
| | NAO | 143 | 73705 | 97.91 |
| | NAT | 113 | 58326 | 98.01 |

| ImageNet | | | | | |
|---|---|---|---|---|---|
| | | | | Acc.(%) | |
| Model | Method | # Params(M) | # MAdds(M) | Top-1 | Top-5 |
| AmoebaNet | / | 5.1 | 555 | 74.5 | 92.0 |
| PNAS | | 5.1 | 588 | 74.2 | 91.9 |
| SNAS | | 4.3 | 522 | 72.7 | 90.8 |

TABLE 2-continued

| | | | | | |
|---|---|---|---|---|---|
| GHN | | 6.1 | 569 | 73.0 | 91.3 |
| ENAS | / | 5.6 | 679 | 73.8 | 91.7 |
| | NAO | 5.5 | 656 | 73.7 | 91.7 |
| | NAT | 5.6 | 679 | 73.9 | 91.8 |
| DARTS | / | 5.9 | 595 | 73.1 | 91.0 |
| | NAO | 6.1 | 627 | 73.3 | 91.1 |
| | NAT | 3.9 | 515 | 74.4 | 92.2 |
| NAONet | / | 11.35 | 1360 | 74.3 | 91.8 |
| | NAO | 11.83 | 1417 | 74.5 | 92.0 |
| | NAT | 8.36 | 1025 | 74.8 | 92.3 |

More verifications are performed on the CIFAR-10, to compare different optimization manners (such as random search, LSTM, and GCN) and different inference methods (that is, sampling-based and maximum probability-based methods). For the NAS method, a random conversion between 0, S, and N is performed on the input architecture. As shown in Table 3, performance comparisons of the network structures are obtained by using different methods on the CIFAR-10, where Maximum-GCN means that a network structure is derived by selecting an operation with a maximum probability, Sampling-GCN (the method used by the optimizer in this application) means that sampling is performed according to a probability distribution, and the sampling-GCN method outperforms all other methods. "/" represents a non-optimized original model.

TABLE 3

| Method | VGG | ResNet20 | MobileNetV2 | ENAS | DARTS | NAONet |
|---|---|---|---|---|---|---|
| / | 93.56 | 91.37 | 94.47 | 97.11 | 97.06 | 97.89 |
| Random Search | 93.17 | 91.56 | 94.38 | 96.58 | 95.17 | 96.31 |
| LSTM | 94.45 | 92.19 | 95.01 | 97.05 | 97.05 | 97.93 |
| Maximum-GCN | 94.37 | 92.57 | 94.87 | 96.92 | 97.00 | 97.90 |
| Sampling-GCN | 95.93 | 92.97 | 95.13 | 97.21 | 97.26 | 97.99 |

The optimization problem is converted into an MDP, and existing operations are optimized by using a series of optimization manners, including a skip connection operation and a null connection operation. It is proved through the CIFAR-10 dataset and the ImageNet dataset that the method used in this embodiment of this application can improve the accuracy and compactness of the neural network structure. It can be learned from FIG. 16 and FIG. 17 that the network structure optimizer proposed in this application may change two null connections in the inputted network structure into two skip connections (skip_connects). Through such a replacement, the performance of the model can be greatly improved without increasing a calculation amount. For performance indexes, refer to Table 4. Table 4 shows performance comparisons (evaluated by using classification accuracy rates) for different inputted network structures before and after optimization.

TABLE 4

| | VGG16 | ResNet20 | MobileNetV2 | ENAS | DARTS | NAONet |
|---|---|---|---|---|---|---|
| Inputted network structure performance | 93.56% | 91.37% | 94.47% | 97.11% | 97.06% | 97.89% |
| Outputted optimized network structure performance | 96.04% | 92.95% | 95.17% | 97.24% | 97.28% | 98.01% |

It can be learned from Table 1 to Table 4 that for an image recognition task, when the optimized network structure is run on the electronic device, the performance of image recognition can be greatly improved due to a case that in this embodiment of this application, redundant calculation units or calculation operations in the network structure can be removed from the optimized network structure relative to the non-optimized network structure, and no additional calculations are introduced. Therefore, when the electronic device performs image recognition, because the structure of the running optimized network structure is simplified, the calculation consumption and memory consumption generated when the processor runs the optimized network structure are saved while the precision of the image recognition can be ensured, thereby improving the efficiency of the image recognition.

An objective of the embodiments of this application is to optimize any architecture to obtain better performance without additional calculation costs. To achieve the objective, the network structure optimizer may delete redundant paths, and replace an original operation with a skip connection, to improve the network structure. The structure optimization process is converted into the MDP. To better use structural information of the structure diagram, any given network structure may be converted into a better directed graph structure by using the GCN. In summary, this application resolves the problem of redundant calculation modules of the existing neural network structure, and further implements the function of optimizing any network structure.

In conclusion, the embodiments of this application have the following beneficial effects by optimizing the network structure of the neural network by using the network structure optimizer:

Feature information is predicted by using the network structure optimizer, optimization manners for the network structure are determined, and the network structure is optimized according to the optimization manners. Any inputted network structure may be optimized. The redundant calculation units or calculation operations in the network structure are removed, thereby saving a subsequent calculation amount; and the neural network model significantly improves the model performance based on the optimized network structure and is applicable to various application scenarios.

The foregoing descriptions are merely embodiments of this application and are not intended to limit the protection scope of this application. Any modification, equivalent replacement, improvement, and the like made within the spirit and range of this application fall within the protection scope of this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

INDUSTRIAL APPLICABILITY

In this embodiment of this application, the electronic device extracts feature information of a network structure of a neural network by using a network structure optimizer, predicts the feature information, to determine a plurality of optimization manners for the network structure, and optimizes the network structure based on the optimization manners of the network structure, to obtain the optimized network structure of the neural network.

What is claimed is:

1. A method for training a network structure optimizer using an image recognition neural network performed by an electronic device, the method comprising:

performing feature extraction on an initial network structure of the image recognition neural network by using the network structure optimizer, to obtain feature information corresponding to the initial network structure of the image recognition neural network, further including:

establishing a directed graph for the initial network structure of the image recognition neural network by using the network structure optimizer, wherein the directed graph is represented by using an ordered triplet (V (D), A (D), wD), wherein D represents the directed graph and wD defines a correlation relationship between an ordered pair of nodes (V (D), A (D)) in the directed graph; and performing feature extraction on the directed graph, to obtain the feature information corresponding to the initial network structure of the image recognition neural network;

predicting the feature information by using the network structure optimizer, to det ermine a plurality of optimization manners for optimizing the initial network structure of the image recognition neural network;

updating the initial network structure of the image recognition neural network according to the optimization manners for the network structure, to obtain a plurality of optimized network structures of the image recognition neural network;

determining an image recognition performance parameter of each of the plurality of optimized network structures of the image recognition neural network, further comprising:

for each of the plurality of optimized network structures of the image recognition neural network, determining an accuracy rate of the optimized network structure relative to the initial network structure of the image recognition neural network by performing image recognition of the same image using the optimized network structure and the initial network structure of the image recognition neural network, respectively;

using the accuracy rate as the image recognition performance parameter of the optimized network structure; and constructing a loss function of the network structure optimizer based on the image recognition performance parameters and calculation costs of the plurality of optimized network structures of the image recognition neural network;

updating a parameter of the network structure optimizer according to the image recognition performance parameters and the calculation costs of the plurality of optimized network structures of the image recognition neural network by backpropagating a value of the loss function in the network structure optimizer until the value of the loss function is less than a preset threshold, the updated network structure optimizer being configured to optimize the network structure of the image recognition neural network to have a maximized accuracy rate and a calculation cost under a predefined limit.

2. The method according to claim 1, wherein the establishing a directed graph for the network structure of the image recognition neural network by using the network structure optimizer comprises:

performing sampling processing on the network structure of the image recognition neural network by using the network structure optimizer, to obtain network layer information for the network structure of the image recognition neural network; and establishing the directed graph for the network structure of the image recognition neural network according to the network layer information.

3. The method according to claim 2, wherein the establishing the directed graph for the network structure of the image recognition neural network according to the network layer information comprises:

determining an input feature or an output feature in the network layer information as node information in the directed graph;

determining operation information in the network layer information as edge information in the directed graph, the operation information comprising at least one of the following: a convolution operation, a skip connection operation, a pooling operation, and a null connection operation; and establishing the directed graph for the network structure according to the node information and the edge information.

4. The method according to claim 1, wherein the performing feature extraction on the directed graph, to obtain the feature information corresponding to the network structure comprises:

determining node information and edge information in the directed graph; and determining the feature information corresponding to the network structure according to learnable parameter matrixes and an activation function in a graph convolutional network (GCN), the node information, and the edge information.

5. The method according to claim 4, wherein the determining the feature information corresponding to the network structure according to learnable parameter matrixes and an activation function in a GCN, the node information, and the edge information comprises:

performing a multiplication operation on the edge information, the node information, and a learnable parameter matrix in a first-layer GCN, to obtain an output of the first-layer GCN;

performing nonlinear transformation on the output of the first-layer GCN by using the activation function in the GCN, to obtain a transformed output of the first-layer GCN;

performing a multiplication operation on the transformed output of the first-layer GCN and a learnable parameter matrix in a second-layer GCN, to obtain an output of the second-layer GCN; and performing a multiplication operation on the output of the second-layer GCN, the edge information, and a learnable parameter matrix of a fully-connected layer in the GCN, to obtain the feature information corresponding to the network structure.

6. The method according to claim 1, wherein the predicting the feature information by using the network structure optimizer, to determine a plurality of optimization manners for the network structure comprises:

classifying the feature information by using the network structure optimizer, and determining probabilities corresponding to the optimization manners of the network structure; and determining, according to the probabilities of the optimization manners of the network structure, optimization manners for the network structure that meet a probability requirement in the plurality of optimization manners.

7. The method according to claim 1, wherein the updating the network structure of the image recognition neural network according to the optimization manners for the network structure, to obtain an optimized network structure of the image recognition neural network comprises:

determining operation information, sizes of network layers, and a quantity of network layers in the optimization manners; and replacing operation information, sizes of network layers, and a quantity of network layers in the network structure of the image recognition neural network with the operation information, the sizes of the network layers, and the quantity of network layers in the optimization manners, to obtain the optimized network structure, the sizes of the network layers comprising at least one of the following: a size of a convolution kernel and a size of a pooling layer.

8. The method according to claim 1, the method further comprising:

performing feature extraction on the network structure of the image recognition neural network by using the updated network structure optimizer, to obtain feature information corresponding to the network structure;

predicting the feature information by using the updated network structure optimizer, to determine optimization manners for the network structure; and updating the network structure of the image recognition neural network according to the optimization manners for the network structure, to obtain an optimized network structure, the optimized network structure being used for performing an image recognition task.

9. The method according to claim 8, wherein the updating the network structure of the image recognition neural network according to the optimization manners for the network structure, to obtain an optimized network structure comprises:

determining operation information, sizes of network layers, and a quantity of network layers in the optimization manners; and replacing operation information, sizes of network layers, and a quantity of network layers in the network structure of the image recognition neural network with the operation information, the sizes of the network layers, and the quantity of network layers in the optimization manners, to obtain the optimized network structure, the operation information comprising at least one of the following: a convolution operation, a skip connection operation, a pooling operation, and a null connection operation; and the sizes of the network layers comprising at least one of the following: a size of a convolution kernel and a size of a pooling layer.

10. An electronic device, comprising:

a memory, configured to store executable instructions; and a processor, configured to perform, when executing the executable instructions stored in the memory, a plurality of operations for training a network structure optimizer using an image recognition neural network including:

performing feature extraction on an initial network structure of the image recognition neural network by using the network structure optimizer, to obtain feature information corresponding to the initial network structure of the image recognition neural network, further including:

establishing a directed graph for the initial network structure of the image recognition neural network by using the network structure optimizer, wherein the directed graph is represented by using an ordered triplet (V (D), A (D), wD), wherein D represents the directed graph and wD defines a correlation relationship between an ordered pair of nodes (V (D), A (D)) in the directed graph; and performing feature extraction on the directed graph, to obtain the feature information corresponding to the initial network structure of the image recognition neural network;

predicting the feature information by using the network structure optimizer, to determine a plurality of optimization manners for optimizing the initial network structure of the image recognition neural network;

updating the initial network structure of the image recognition neural network according to the optimization manners for the network structure, to obtain a plurality of optimized network structures of the image recognition neural network;

determining an image recognition performance parameter of each of the plurality of optimized network structures of the image recognition neural network, further comprising:

for each of the plurality of optimized network structures of the image recognition neural network, determining an accuracy rate of the optimized network structure relative to the initial network structure of the image recognition neural network by performing image recognition of the same image using the optimized network structure and the initial network structure of the image recognition neural network, respectively;

using the accuracy rate as the image recognition performance parameter of the optimized network structure; and constructing a loss function of the network structure optimizer based on the image recognition performance parameters and calculation costs of the plurality of optimized network structures of the image recognition neural network;

updating a parameter of the network structure optimizer according to the image recognition performance parameters and the calculation costs of the plurality of optimized network structures of the image recognition neural network by backpropagating a value of the loss function in the network structure optimizer until the value of the loss function is less than a preset threshold, the updated network structure optimizer being configured to optimize the network structure of the image recognition neural network to have a maximized accuracy rate and a calculation cost under a predefined limit.

11. The electronic device according to claim 10, wherein the establishing a directed graph for the network structure of the image recognition neural network by using the network structure optimizer comprises:

performing sampling processing on the network structure of the image recognition neural network by using the network structure optimizer, to obtain network layer information for the network structure of the image recognition neural network; and establishing the directed graph for the network structure of the image recognition neural network according to the network layer information.

12. The electronic device according to claim 11, wherein the establishing the directed graph for the network structure of the image recognition neural network according to the network layer information comprises:

determining an input feature or an output feature in the network layer information as node information in the directed graph;

determining operation information in the network layer information as edge information in the directed graph, the operation information comprising at least one of the following: a convolution operation, a skip connection operation, a pooling operation, and a null connection operation; and establishing the directed graph for the network structure according to the node information and the edge information.

13. The electronic device according to claim 10, wherein the performing feature extraction on the directed graph, to obtain the feature information corresponding to the network structure comprises:

determining node information and edge information in the directed graph; and determining the feature information corresponding to the network structure according to learnable parameter matrixes and an activation function in a graph convolutional network (GCN), the node information, and the edge information.

14. The electronic device according to claim 13, wherein the determining the feature information corresponding to the network structure according to learnable parameter matrixes and an activation function in a GCN, the node information, and the edge information comprises:

performing a multiplication operation on the edge information, the node information, and a learnable parameter matrix in a first-layer GCN, to obtain an output of the first-layer GCN;

performing nonlinear transformation on the output of the first-layer GCN by using the activation function in the GCN, to obtain a transformed output of the first-layer GCN;

performing a multiplication operation on the transformed output of the first-layer GCN and a learnable parameter matrix in a second-layer GCN, to obtain an output of the second-layer GCN; and performing a multiplication operation on the output of the second-layer GCN, the edge information, and a learnable parameter matrix of a fully-connected layer in the GCN, to obtain the feature information corresponding to the network structure.

15. The electronic device according to claim 10, wherein the predicting the feature information by using the network structure optimizer, to determine a plurality of optimization manners for the network structure comprises:

classifying the feature information by using the network structure optimizer, and determining probabilities corresponding to the optimization manners of the network structure; and determining, according to the probabilities of the optimization manners of the network structure, optimization manners for the network structure that meet a probability requirement in the plurality of optimization manners.

16. The electronic device according to claim 10, wherein the updating the network structure of the image recognition neural network according to the optimization manners for the network structure, to obtain an optimized network structure of the image recognition neural network comprises:

determining operation information, sizes of network layers, and a quantity of network layers in the optimization manners; and replacing operation information, sizes of network layers, and a quantity of network layers in the network structure of the image recognition neural network with the operation information, the sizes of the network layers, and the quantity of network layers in the optimization manners, to obtain the optimized network structure, the sizes of the network layers comprising at least one of the following: a size of a convolution kernel and a size of a pooling layer.

17. The electronic device according to claim 10, wherein the plurality of operations further comprises:

performing feature extraction on the network structure of the image recognition neural network by using the updated network structure optimizer, to obtain feature information corresponding to the network structure;

predicting the feature information by using the updated network structure optimizer, to determine optimization manners for the network structure; and updating the network structure of the image recognition neural network according to the optimization manners for the network structure, to obtain an optimized network structure, the optimized network structure being used for performing an image recognition task.

18. A non-transitory computer-readable storage medium, storing executable instructions, when executed by a processor of an electronic device, configured to cause the electronic device to perform a plurality of operations for training a network structure optimizer using an image recognition neural network including:

performing feature extraction on an initial network structure of the image recognition neural network by using the network structure optimizer, to obtain feature information corresponding to the initial network structure of the image recognition neural network, further including:

establishing a directed graph for the initial network structure of the image recognition neural network by using the network structure optimizer, wherein the directed graph is represented by using an ordered triplet (V (D), A (D), wD), wherein D represents the directed graph and wD defines a correlation relationship between an ordered pair of nodes (V (D), A (D)) in the directed graph; and performing feature extraction on the directed graph, to obtain the feature information corresponding to the initial network structure of the image recognition neural network;

predicting the feature information by using the network structure optimizer, to determine a plurality of optimization manners for optimizing the initial network structure of the image recognition neural network;

updating the initial network structure of the image recognition neural network according to the optimization manners for the network structure, to obtain a plurality of optimized network structures of the image recognition neural network;

determining an image recognition performance parameter of each of the plurality of optimized network structures of the image recognition neural network, further comprising:

for each of the plurality of optimized network structures of the image recognition neural network, determining an accuracy rate of the optimized network structure relative to the initial network structure of the image recognition neural network by performing image recognition of the same image using the optimized network structure and the initial network structure of the image recognition neural network, respectively;

using the accuracy rate as the image recognition performance parameter of the optimized network structure; and constructing a loss function of the network structure optimizer based on the image recognition performance parameters and calculation costs of the plurality of optimized network structures of the image recognition neural network;

updating a parameter of the network structure optimizer according to the image recognition performance parameters and the calculation costs of the plurality of optimized network structures of the image recognition neural network by backpropagating a value of the loss function in the network structure optimizer until the value of the loss function is less than a preset threshold, the updated network structure optimizer being configured to optimize the network structure of the image recognition neural network to have a maximized accuracy rate and a calculation cost under a predefined limit.

19. The non-transitory computer-readable storage medium according to claim 18, wherein the establishing a directed graph for the network structure of the image recognition neural network by using the network structure optimizer comprises:

performing sampling processing on the network structure of the image recognition neural network by using the network structure optimizer, to obtain network layer information for the network structure of the image recognition neural network; and establishing the directed graph for the network structure of the image recognition neural network according to the network layer information.

20. The non-transitory computer-readable storage medium according to claim 18, wherein the performing feature extraction on the directed graph, to obtain the feature information corresponding to the network structure comprises:

determining node information and edge information in the directed graph; and determining the feature information corresponding to the network structure according to learnable parameter matrixes and an activation function in a graph convolutional network (GCN), the node information, and the edge information.

* * * * *